US012777246B2

(12) United States Patent
Ozawa

(10) Patent No.: US 12,777,246 B2
(45) Date of Patent: Oct. 27, 2026

(54) IMAGING DEVICE AND METHOD OF OPERATING IMAGING DEVICE INCLUDING AN APPLICATION PROCESSOR THAT SUPPLIES A SETTING VALUE TO AN IMAGE SENSOR AND A COMPANION CHIP

(71) Applicant: SONY SEMICONDUCTOR SOLUTIONS CORPORATION, Kanagawa (JP)

(72) Inventor: Hiroyuki Ozawa, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 44 days.

(21) Appl. No.: 18/878,632

(22) PCT Filed: Jun. 20, 2023

(86) PCT No.: PCT/JP2023/022699
§ 371 (c)(1),
(2) Date: Dec. 23, 2024

(87) PCT Pub. No.: WO2024/009750
PCT Pub. Date: Jan. 11, 2024

(65) Prior Publication Data

US 2025/0392812 A1 Dec. 25, 2025

(30) Foreign Application Priority Data

Jul. 6, 2022 (JP) ................................ 2022-108845

(51) Int. Cl.
*H04N 5/335* (2011.01)
*H04N 23/60* (2023.01)
*H04N 25/76* (2023.01)

(52) U.S. Cl.
CPC ....... *H04N 23/665* (2023.01); *H04N 25/7795* (2023.01)

(58) Field of Classification Search
CPC ...................................................... H04N 23/60
See application file for complete search history.

(56) References Cited

U.S. PATENT DOCUMENTS

2022/0321494 A1* 10/2022 Watanabe ........... H04L 47/6215

FOREIGN PATENT DOCUMENTS

JP 2017092781 A 5/2017
JP 2017183952 A 10/2017
(Continued)

OTHER PUBLICATIONS

International Search Report and Written Opinion of PCT Application No. PCT/JP2023/022699, issued on Sep. 12, 2023, 11 pages of ISRWO.

*Primary Examiner* — Gary C Vieaux
(74) *Attorney, Agent, or Firm* — CHIP LAW GROUP

(57) ABSTRACT

The present disclosure relates to an imaging device and a method of operating the imaging device that make it possible to inhibit inconsistency in mutual setting values in signal processing executed by an image sensor and a companion chip. The image sensor stores identification information for identifying a setting value used for the signal processing of image data in the image data, and outputs the image data to the companion chip, and the companion chip reads the identification information stored in the image data, and performs second signal processing on the image data by using the setting value corresponding to the identification information. The present disclosure is applicable to an imaging device.

12 Claims, 13 Drawing Sheets

(56) References Cited

FOREIGN PATENT DOCUMENTS

| | | | |
|---|---|---|---|
| JP | 2021064860 | A | 4/2021 |
| JP | 2021068950 | A | 4/2021 |
| WO | 2015022900 | A1 | 2/2015 |

* cited by examiner

IMAGING DEVICE AND METHOD OF OPERATING IMAGING DEVICE INCLUDING AN APPLICATION PROCESSOR THAT SUPPLIES A SETTING VALUE TO AN IMAGE SENSOR AND A COMPANION CHIP

CROSS REFERENCE TO RELATED APPLICATIONS

This application is a U.S. National Phase of International Patent Application No. PCT/JP2023/022699 filed on Jun. 20, 2023, which claims priority benefit of Japanese Patent Application No. JP 2022-108845 filed in the Japan Patent Office on Jul. 6, 2022. Each of the above-referenced applications is hereby incorporated herein by reference in its entirety.

TECHNICAL FIELD

The present disclosure relates to an imaging device and a method of operating the imaging device, and more particularly, to an imaging device and a method of operating the imaging device enabled to inhibit inconsistency in setting values in signal processing executed by an image sensor and a companion chip.

BACKGROUND ART

When an image sensor or a sensing sensor has a large built-in function and cannot be accommodated in a single chip, a companion chip may be provided at a subsequent stage to cope with this.

As a technology using the companion chip, a technology has been devised in which setting values transmitted from an application processor (AP) are synchronized with each other between the image sensor and the companion chip (see Patent Document 1).

CITATION LIST

Patent Document

Patent Document 1: Japanese Patent Application Laid-Open No.

SUMMARY OF THE INVENTION

Problems to be Solved by the Invention

Normally, setting of a parameter for control is performed by an interface such as I2C from the application processor (AP), and a setting reflection inhibition signal (GPH) is used so that a series of setting values of each of pieces of frame processing is not divided by a vertical synchronization signal (Vsync).

However, since there is a time difference in the transmission of the setting values to the image sensor and the companion chip, the GPH signal itself is recognized by different vertical synchronization signals Vsync between the image sensor and the companion chip, and thus, there is a case where inconsistency occurs in the setting values used for signal processing between the image sensor and the companion chip.

The present disclosure has been made in view of such a situation, and in particular, is intended to inhibit inconsistency in setting values in signal processing executed by the image sensor and the companion chip.

Solutions to Problems

An imaging device of one aspect of the present disclosure is an imaging device including: an image sensor that captures an image and performs first signal processing on the image to output the image as image data; a companion chip that performs second signal processing on the image data output from the image sensor to output the image data; and an application processor that supplies a setting value to each of the first signal processing performed by the image sensor and the second signal processing performed by the companion chip, in which the image sensor stores identification information for identifying the setting value used for the first signal processing in the image data, and outputs the image data to the companion chip, and the companion chip reads the identification information stored in the image data, and performs the second signal processing on the image data by using the setting value corresponding to the identification information.

A method of operating an imaging device of one aspect of the present disclosure is a method of operating an imaging device including: an image sensor; a companion chip; and an application processor, the method including a step in which: the image sensor captures an image, and performs first signal processing on the image to output the image as image data; the companion chip performs second signal processing on the image data output from the image sensor to output the image data; and the application processor supplies a setting value to each of the first signal processing performed by the image sensor and the second signal processing performed by the companion chip, in which the image sensor stores identification information for identifying the setting value used for the first signal processing in the image data, and outputs the image data to the companion chip, and the companion chip reads the identification information stored in the image data, and performs the second signal processing on the image data by using the setting value corresponding to the identification information.

In one aspect of the present disclosure, an image is captured and subjected to the first signal processing to be output as image data, by the image sensor; the image data is subjected to the second signal processing to be output by the companion chip; a setting value is supplied to each of the first signal processing and the second signal processing; identification information for identifying the setting value used for the first signal processing is stored in the image data and output to the companion chip, by the image sensor; and the identification information stored in the image data is read and the setting value corresponding to the identification information is used to perform the second signal processing on the image data, by the companion chip.

MODE FOR CARRYING OUT THE INVENTION

Hereinafter, a preferred embodiment of the present disclosure will be described in detail with reference to the accompanying drawings. Note that, in the present specification and drawings, components having substantially the same functional configuration are denoted by the same reference signs, and redundant description is omitted.

Hereinafter, modes for carrying out the present technology will be described. The description will be given in the following order.

1. Outline of present disclosure
2. Preferred embodiment

1. Outline of Present Disclosure

<Inconsistency in Setting Values that Occurs Between Image Sensor and Companion Chip>

Figure 1:
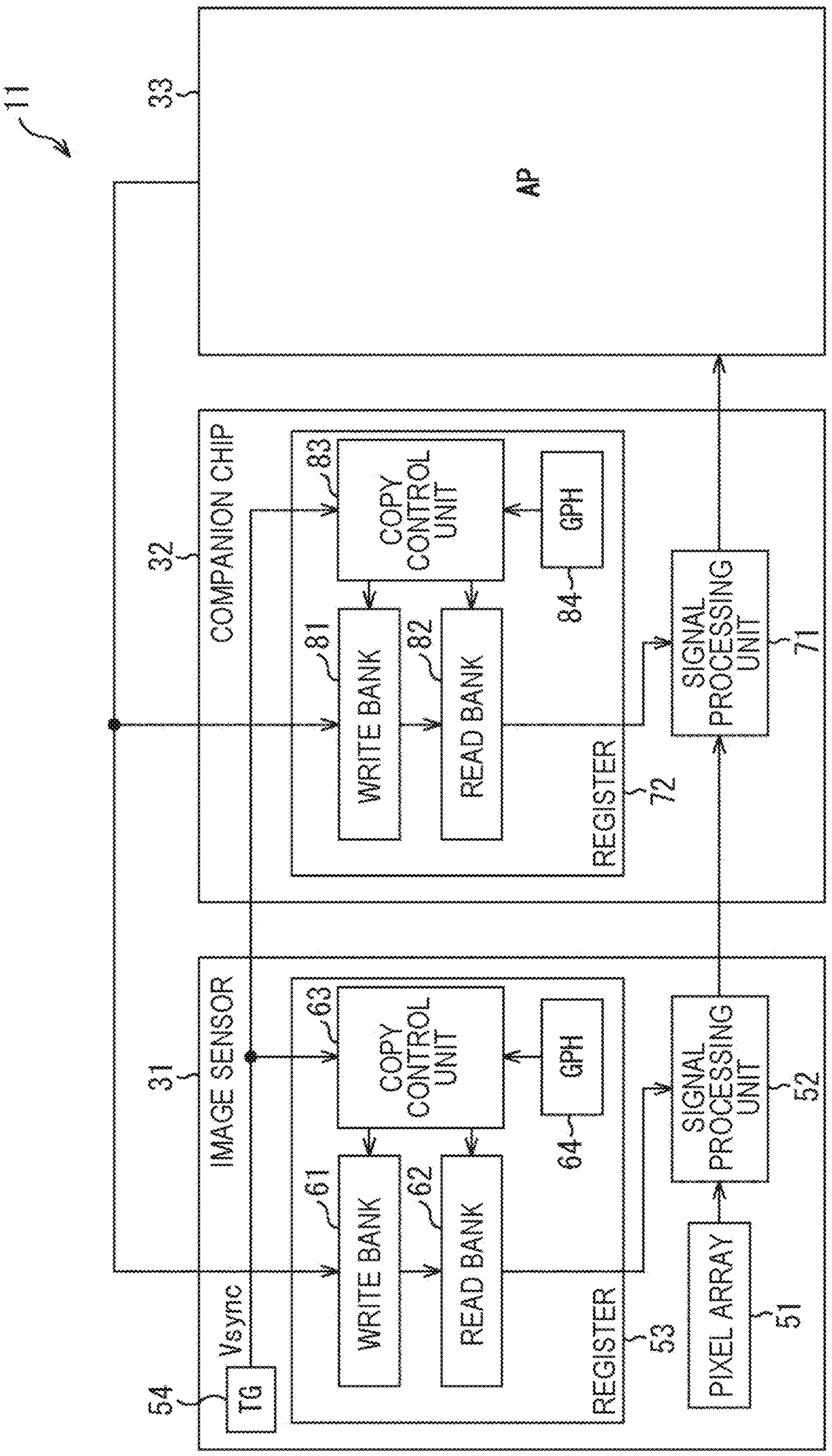
FIG. 1 is a diagram illustrating an outline of the present disclosure.

FIG. 1 illustrates a configuration example of a general imaging device including an image sensor and a companion chip.

An imaging device 11 in FIG. 1 includes an image sensor 31, a companion chip 32, and an application processor (AP) 33.

The image sensor 31 includes, for example, a lens and an imaging element (neither is illustrated), captures an image, performs signal processing of a processing content corresponding to a setting value supplied from the AP 33 on image data corresponding to the captured image, and outputs processed image data to the companion chip 32.

The companion chip 32 is basically configured to execute signal processing that cannot be processed in the image sensor 31 among pieces of signal processing performed in the image sensor 31, and performs signal processing of a processing content corresponding to a setting value supplied from the AP 33 on an image that has been subjected to the signal processing in the image sensor 31 and is supplied from the image sensor 31, and outputs processed image to the AP 33.

That is, when all necessary signal processing can be performed on the image data in the image sensor 31, the companion chip 32 is an unnecessary component. However, in recent years, functions required for the image sensor 31 have been continuously increasing, and more signal processing has been required, and opportunities has been increasing where the companion chip 32 is required.

The AP 33 notifies the image sensor 31 and the companion chip 32 of various setting values of the signal processing in units of frames, which should be performed by them on the image data, by I2C communication, for example.

The AP 33 receives the image data transmitted from the image sensor 31 via the companion chip 32, and performs processing corresponding to various applications executed in the imaging device 11 on the image data.

The image sensor 31 includes a pixel array 51, a signal processing unit 52, a register 53, and a timing generator (TG) 54.

The pixel array 51 includes a component in which an imaging element are arranged in an array, for example, a (complementary metal oxide semiconductor) image sensor, a charge coupled device (CCD) image sensor, or the like, and when a pixel signal including an analog signal corresponding to an amount of incident light incident through a lens (not illustrated) is generated, the pixel signal is subjected to analog-digital conversion to be output to the signal processing unit 52 as image data.

On the basis of a setting value supplied from the AP 33 via the register 53, the signal processing unit 52 performs signal processing of a processing content corresponding to the setting value on the image data, and outputs processed image data to the companion chip 32.

The register 53 operates on the basis of Vsync (vertical synchronization signal) supplied from the timing generator (TG) 54, and supplies information of the setting value supplied from the AP 33 to the signal processing unit 52.

More specifically, the register 53 includes a write bank 61, a read bank 62, a copy control unit 63, and a GPH adjustment unit 64.

The write bank 61 temporarily stores the setting value supplied from the AP 33 via the I2C or the like.

In the read bank 62, when the setting value stored in the write bank 61 is copied and stored on the basis of Vsync and a setting reflection inhibition signal (Group Parameter Hold: GPH), the signal processing unit 52 reads the setting value stored in the read bank 62 and uses the setting value for signal processing.

On the basis of the setting reflection inhibition signal (Group Parameter Hold: GPH) generated by the GPH adjustment unit 64 and the vertical synchronization signal Vsync, when it is a timing at which the vertical synchronization signal Vsync is detected and the setting reflection inhibition signal GPH is Low, the copy control unit 63 performs control to copy the setting value of the write bank 61 to the read bank 62.

On the other hand, when the setting reflection inhibition signal GPH is High even at the timing at which the vertical synchronization signal Vsync is detected, the copy control unit 63 performs control not to copy the setting value of the write bank 61 to the read bank 62.

The GPH adjustment unit 64 generates the setting reflection inhibition signal (Group Parameter Hold: GPH) for performing adjustment so that a series of setting values of each of pieces of frame processing is not divided by the vertical synchronization signal Vsync, and supplies the setting reflection inhibition signal to the copy control unit 63.

That is, the GPH adjustment unit 64 outputs the setting reflection inhibition signal GPH as a High signal in a period in which the series of setting values from the AP 33 is written in the write bank 61, and outputs the setting reflection inhibition signal GPH as a Low signal in a period after completion of writing of the series of setting values from the AP 33 in the write bank 61.

That is, if the setting reflection inhibition signal GPH is High at a timing at which the vertical synchronization signal Vsync is supplied, it is recognized that the setting value is in an incomplete state in the middle of writing to the write bank 61, and if the setting reflection inhibition signal GPH is Low, it is recognized that the setting value is in a complete state in which writing to the write bank 61 has been completed.

As a result, if the setting reflection inhibition signal GPH is High at the timing at which the vertical synchronization signal Vsync is supplied, the copy control unit 63 does not perform copy control to the read bank 62 since the setting value of the write bank 61 is an incomplete value in the middle of writing.

On the other hand, if the setting reflection inhibition signal GPH is Low at the timing at which the vertical synchronization signal Vsync is supplied, the copy control unit 63 performs copy control to the read bank 62 since the setting value of the write bank 61 is a complete value that has already been written.

Note that the control similarly applies to a write bank 81, a read bank 82, a copy control unit 83, and a GPH adjustment unit 84 in a register 72 of the companion chip 32.

The TG 54 generates the vertical synchronization signal Vsync and supplies the vertical synchronization signal Vsync to the copy control unit 63 of the register 53 of the image sensor 31 and the copy control unit 83 of the register 72 of the companion chip 32.

The companion chip 32 includes a signal processing unit 71, the register 72, and the timing generator (TG) 54.

The signal processing unit 71 performs signal processing of a corresponding processing content on the image data supplied from the image sensor 31 on the basis of the setting value supplied from the AP 33 via the register 72, and outputs processed image data to the AP 33.

The register 72 operates on the basis of the vertical synchronization signal Vsync supplied from the timing generator (TG) 54, and supplies information of the setting value supplied from the AP 33 to the signal processing unit 71.

More specifically, the register 72 basically has a configuration similar to the register 53, and includes the write bank 81, the read bank 82, the copy control unit 83, and the GPH adjustment unit 84.

The write bank 81 temporarily stores the setting value supplied from the AP 33 via the I2C or the like.

When the setting value stored in the write bank 81 is copied and stored in the read bank 82 on the basis of the vertical synchronization signal Vsync and the setting reflection inhibition signal GPH, the signal processing unit 71 reads the setting value stored in the read bank 82 and performs signal processing of a processing content corresponding to the setting value on the image data.

On the basis of the setting reflection inhibition signal GPH generated by the GPH adjustment unit 84 and the vertical synchronization signal Vsync, the copy control unit 83 performs control to copy the setting value of the write bank 81 to the read bank 82 when it is a timing at which the vertical synchronization signal Vsync is detected as the High signal (=1) and the setting reflection inhibition signal GPH is the Low signal.

On the other hand, when the setting reflection inhibition signal GPH is High even at the timing at which the vertical synchronization signal Vsync is detected as the High signal (=1), the copy control unit 83 performs control not to copy the setting value of the write bank 81 to the read bank 82.

The GPH adjustment unit 84 generates the setting reflection inhibition signal GPH for causing a series of setting values of each of pieces of frame processing not to be divided by the vertical synchronization signal Vsync, and supplies the setting reflection inhibition signal GPH to the copy control unit 83.

Figure 2:
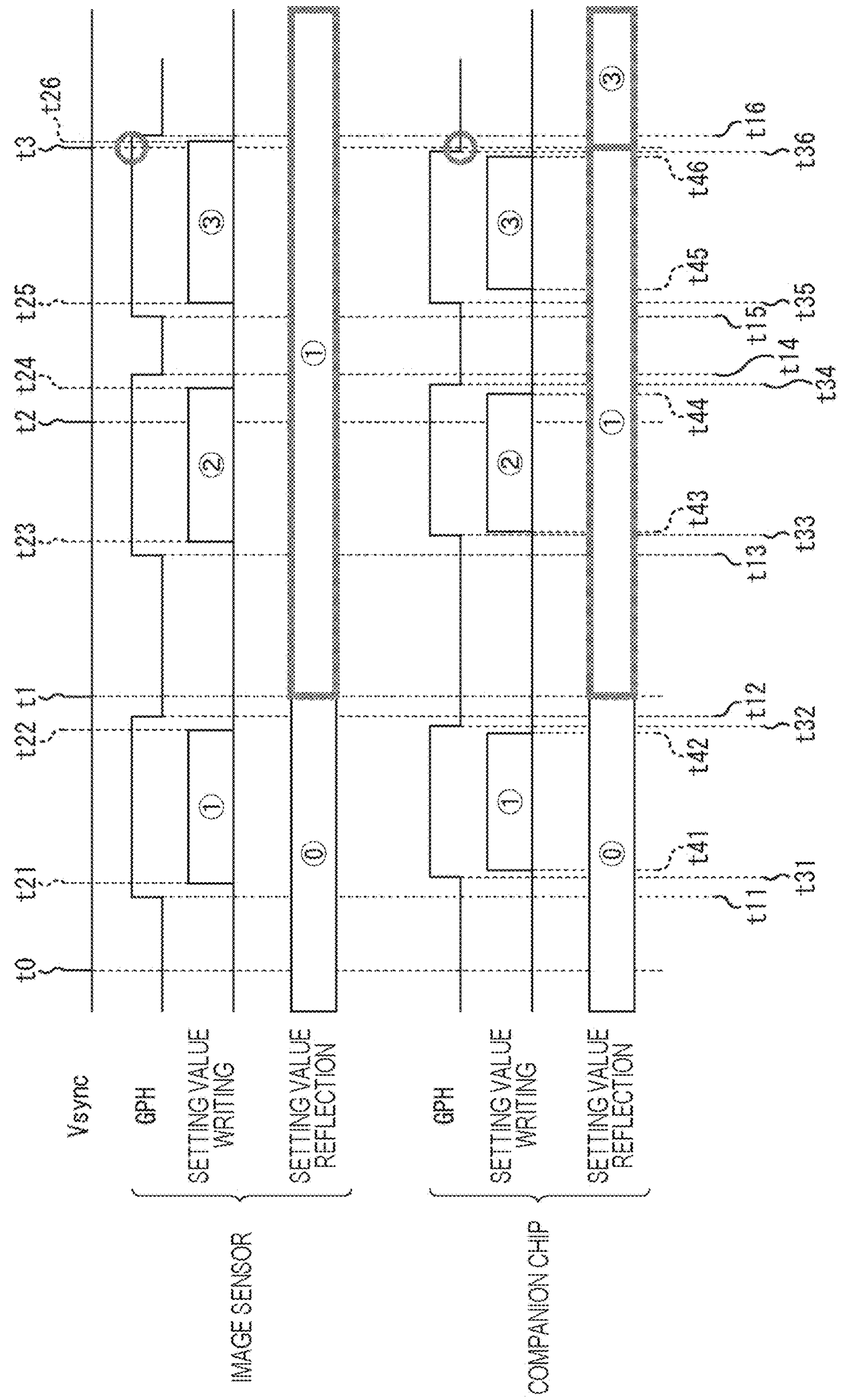
FIG. 2 is a diagram illustrating inconsistency in setting values between an image sensor and a companion chip.

With the above configuration, the imaging device 11 performs, for example, an operation as illustrated in the timing chart of FIG. 2.

Note that, FIG. 2 illustrates, from the top, the vertical synchronization signal Vsync, the setting reflection inhibition signal GPH of the image sensor 31, setting value writing indicating a written setting value, setting value reflection indicating a setting value reflected in the signal processing unit 52, the setting reflection inhibition signal GPH of the companion chip 32, setting value writing indicating a written setting value, and the setting value reflection indicating a setting value reflected in the signal processing unit 71.

Furthermore, in FIG. 2, a numerical value drawn in a circle is a number for identifying a setting value. For example, if the inside of the circle is 0, the numerical value represents the 0th setting value supplied from the AP 33 (that is, a setting value that is an initial value). For example, if the inside of the circle is 1, the numerical value represents the first setting value supplied from the AP 33.

That is, at a timing at which Vsync is generated at time to, the 0th setting value, that is, the initial value of the setting value is stored in the read banks 62 and 82, and is reflected in the signal processing units 52 and 71.

In the image sensor 31, the setting reflection inhibition signal GPH is set to High from time t11 to time t12, and the first setting value from the AP 33 is written to the write bank 61 from time t21 to time t22.

Then, when the vertical synchronization signal Vsync is generated at time t1, since the setting reflection inhibition signal GPH is the Low signal, the copy control unit 63 performs control to copy the first setting value of the write bank 61 to the read bank 62, so that, after the time t1, in the signal processing unit 52, the first setting value is reflected and signal processing is performed.

Subsequently, when the setting reflection inhibition signal GPH of the image sensor 31 is set to High from time t13 to time t14, the second setting value from the AP 33 is written to the write bank 61 from time t23 to time t24.

Since the setting reflection inhibition signal GPH is High when the vertical synchronization signal Vsync is generated at time t2, the copy control unit 63 does not control to copy the first setting value of the write bank 61 to the read bank 62, so that the first setting value is reflected in the signal processing unit 52 even after the time t2.

Moreover, subsequently, when the setting reflection inhibition signal GPH of the image sensor 31 is set to High from time t15 to time t16, the third setting value from the AP 33 is written to the write bank 61 from time t25 to time t26.

Since the setting reflection inhibition signal GPH is also High when the vertical synchronization signal Vsync is generated at time t3, the copy control unit 63 does not perform control to copy the first setting value of the write bank 61 to the read bank 62, so that the first setting value is reflected in the signal processing unit 52 even after the time t3.

On the other hand, in the companion chip 32, when the setting reflection inhibition signal GPH is set to High from time t31 to time t32, the first setting value from the AP 33 is written to the write bank 61 from time t41 to time t42.

Then, when the vertical synchronization signal Vsync is generated at the time t1, since the setting reflection inhibition signal GPH is the Low signal, the copy control unit 83 performs control to copy the first setting value of the write bank 81 to the read bank 82, so that the first setting value is reflected in the signal processing unit 71 after the time t1.

Subsequently, when the setting reflection inhibition signal GPH of the companion chip 32 is set to High from time t33 to time t34, the second setting value from the AP 33 is written to the write bank 81 from time t43 to time t44.

Since the setting reflection inhibition signal GPH is High when the vertical synchronization signal Vsync is generated at the time t2, the copy control unit 83 does not perform control to copy the first setting value of the write bank 81 to the read bank 82, so that the first setting value is reflected in the signal processing unit 71 even after the time t2.

Moreover, subsequently, when the setting reflection inhibition signal GPH of the companion chip 32 is set to High from time t35 to time t36, the third setting value from the AP 33 is written to the write bank 81 from time t45 to time t46.

Since the setting reflection inhibition signal GPH is Low when the vertical synchronization signal Vsync is generated at the time t3, the copy control unit 83 performs control to copy the third setting value of the write bank 61 to the read bank 62, so that the third setting value is reflected in the signal processing unit 71 after the time t3.

That is, as indicated by circles at the time t3 in the setting reflection inhibition signals GPH in FIG. 2, after the time t3, the signal processing unit 52 of the image sensor 31 is in a state in which the first setting value supplied from the AP 33 is reflected, but the signal processing unit 71 of the companion chip 32 is in a state in which the third setting value supplied from the AP 33 is reflected.

As described above, although the signal processing units 52 and 71 are originally required to perform signal processing with the same setting value on the same image data, inconsistency in setting values may occur and a state may occur in which different setting values are reflected.

This is because times required to reflect the respective setting values in the image sensor 31 and the companion chip 32 are different from each other, and this causes a deviation to occur between timings of High or Low of the respective setting reflection inhibition signals GPH of the image sensor 31 and the companion chip 32.

Thus, in the present disclosure, in the image sensor 31, a group number is stored in the image data and output to the companion chip 32, the group number identifying an order in which a setting value is supplied from the AP 33, the setting value being a value to which a processing content of signal processing performed corresponds.

Then, in the companion chip 32, setting values from the AP 33 are stored in plurality in the order of transmission, and a setting value corresponding to the group number included in the image data supplied from the image sensor 31 is read and reflected in the signal processing, whereby inconsistency in the setting values is inhibited.

2. Preferred Embodiment

<Configuration Example of Imaging Device of Present Disclosure>

A configuration example of an imaging device of the present disclosure will be described with reference to FIG. 3.

Figure 3:
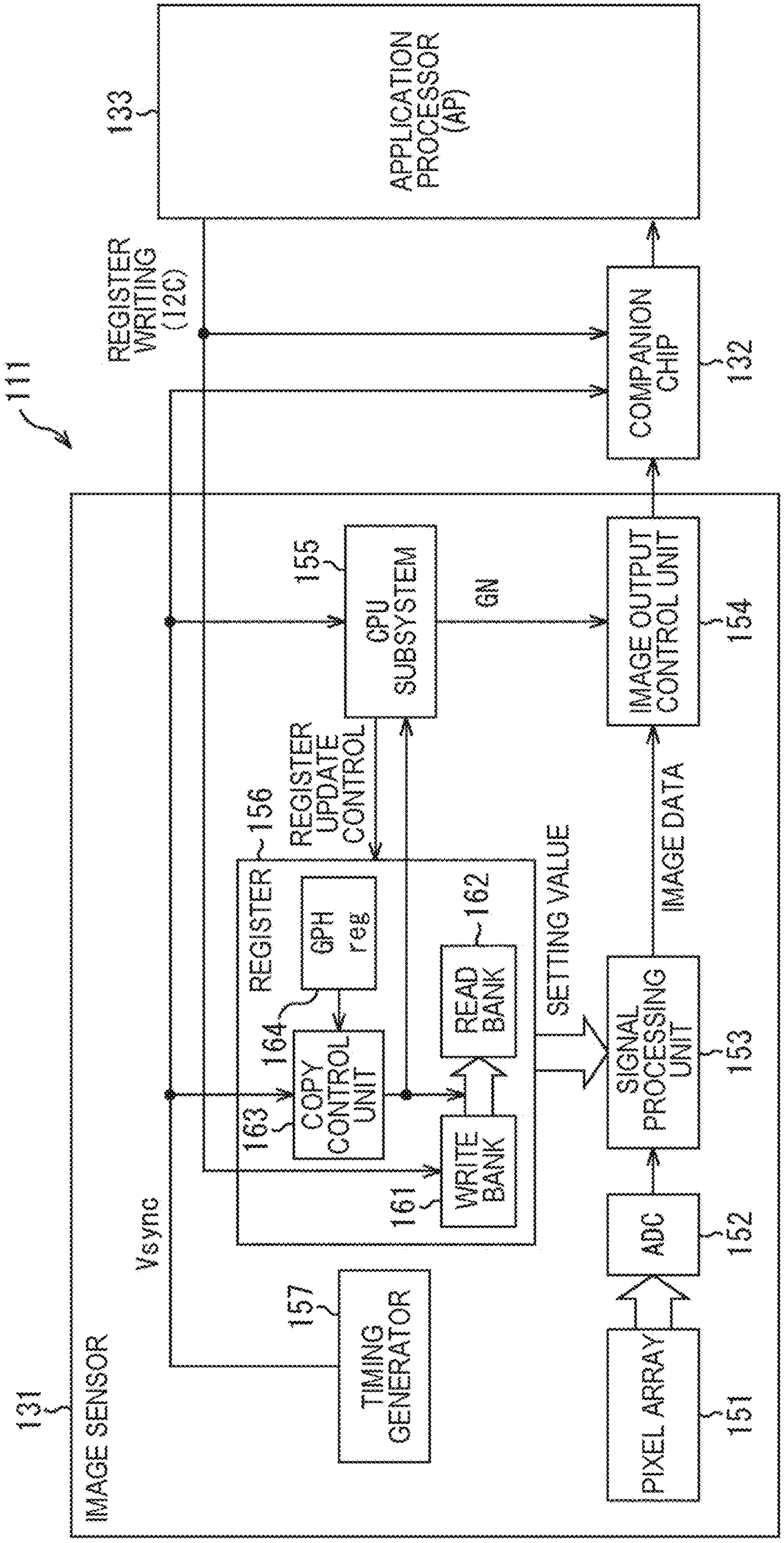
FIG. 3 is a diagram illustrating a configuration example of an imaging device of the present disclosure.

An imaging device 111 in FIG. 3 includes an image sensor 131, a companion chip 132, and an application processor (AP) 133.

Note that the image sensor 131, the companion chip 132, and the application processor (AP) 133 basically have configurations corresponding to the image sensor 31, the companion chip 32, and the AP 33 in FIG. 1, respectively.

The image sensor 131 includes, for example, a lens or an imaging element (neither is illustrated), captures an image, performs signal processing of a processing content corresponding to a setting value supplied from the AP 133 on image data corresponding to the captured image, stores a group number GN for identifying the order in which the setting value is transmitted from the AP 133 and outputs the group number GN to the companion chip 132.

The companion chip 132 is configured to execute signal processing that cannot be processed in the image sensor 131 among pieces of signal processing basically performed in the image sensor 131.

The companion chip 132 performs signal processing of the processing content corresponding to the setting value supplied from the AP 133 on the image data subjected to the signal processing in the image sensor 131 supplied from the image sensor 131, and outputs processed image data to the AP 133.

More specifically, the companion chip 132 stores a plurality of setting values in orders in which the plurality of setting values is supplied from the AP 133, and reads the group number GN corresponding to the setting value applied to the signal processing performed in the image sensor 131, stored in the image data. Then, the companion chip 132 reads a setting value transmitted from the AP 133 in the order corresponding to the group number GN among the plurality of stored setting values, and executes signal processing on the image data with a corresponding processing content.

Note that the detailed configuration of the companion chip 132 will be described later with reference to FIG. 4.

The AP 133 notifies the image sensor 131 and the companion chip 132 of setting values for setting processing contents of signal processing to be respectively performed by them on the image data in units of frames by, for example, I2C communication.

The AP 133 receives image data transmitted from the image sensor 131 via the companion chip 132, and performs processing corresponding to various applications executed in the imaging device 111 on the image data.

The image sensor 131 includes a pixel array 151, an ADC 152, a signal processing unit 153, an image output control unit 154, a CPU subsystem 155, a register 156, and a timing generator 157.

The pixel array 151 includes a component in which imaging elements are arranged in an array, for example, a (complementary metal oxide semiconductor) image sensor, a charge coupled device (CCD) image sensor, or the like, and captures an image including a pixel signal corresponding to an amount of incident light incident through a lens (not illustrated) as image data including analog data and outputs the image data to the ADC 152.

The analog digital converter (ADC) 152 converts the image data including the analog data into digital data and outputs the digital data to the signal processing unit 153.

The signal processing unit 153 performs signal processing of a processing content corresponding to the setting value supplied from the AP 133 via the register 156 on the image data and outputs processed image data to the image output control unit 154.

The image output control unit 154 converts the image data supplied from the signal processing unit 153 into a data format of a protocol compatible with an interface standard such as mobile industry processor interface (MIPI) or scalable low voltage signaling (SLVS), and outputs the data to the companion chip 132.

At this time, the image output control unit 154 acquires the group number GN that is supplied from the CPU subsystem 155 and for identifying the order in which the setting value to be set for the processing content of the signal processing performed on the current image data is transmitted from the AP 133, and stores the group number GN in the data format of the image data.

The CPU subsystem 155 controls writing of the setting value from the AP 133 to a write bank 161 on the basis of the vertical synchronization signal Vsync supplied from the timing generator 157.

The CPU subsystem 155 sets the group number GN for identifying the setting value on the basis of the vertical synchronization signal Vsync, and a copy control signal supplied from the register 156 when the setting value is copied from the write bank 161 to a read bank 162, and outputs the group number GN to the image output control unit 154.

More specifically, the CPU subsystem 155 includes a counter g (g=0, 1, 2, . . . , N) for managing the group number GN, sequentially increments by 1 when the vertical synchronization signal Vsync is supplied from the timing generator 157, and sets the group number GN to a value of the counter g when the copy control signal is supplied that is supplied from the register 156 when the setting value is copied from the write bank 161 to the read bank 162.

Note that the maximum value N of the counter g corresponds to the number of read banks 182-0 to 182-N provided in the register 172 of the companion chip 132 to be described later.

The register 156 operates on the basis of the vertical synchronization signal Vsync supplied from the timing generator 157, and supplies information of the setting value supplied from the AP 133 to the signal processing unit 153.

More specifically, the register 156 includes the write bank 161, the read bank 162, a copy control unit 163, and a GPH adjustment unit (GPH reg) 164.

The write bank 161 is controlled by the CPU subsystem 155, and temporarily stores the setting value supplied from the AP 133 via the I2C or the like on the basis of the vertical synchronization signal Vsync.

When the copy control signal supplied from the copy control unit 163 is supplied on the basis of the vertical synchronization signal Vsync and the setting reflection inhibition signal (Group Parameter Hold: GPH), the setting value stored in the write bank 161 is copied and stored in the read bank 162.

The signal processing unit 153 reads the setting value stored in the read bank 162 and performs the signal processing of the corresponding processing content on the image data.

On the basis of the setting reflection inhibition signal (Group Parameter Hold: GPH) generated by the GPH adjustment unit 164 and the vertical synchronization signal Vsync, when it is a timing at which the vertical synchronization signal Vsync is detected and GPH is Low, the copy control unit 163 outputs the copy control signal for performing control to copy the setting value of the write bank 161 to the read bank 162.

On the other hand, when the setting reflection inhibition signal GPH is High even at the timing at which the vertical synchronization signal Vsync is detected, the copy control unit 163 performs control not to copy the setting value of the write bank 161 to the read bank 162. That is, in this case, the copy control unit 163 does not output the copy control signal.

The GPH adjustment unit 164 generates the setting reflection inhibition signal GPH for causing a series of setting values of each of pieces of frame processing not to be divided by the vertical synchronization signal Vsync, and supplies the setting reflection inhibition signal GPH to the copy control unit 163.

That is, the GPH adjustment unit 164 outputs the setting reflection inhibition signal GPH as the High signal in a period in which the series of setting values from the AP 133 is written in the write bank 161, and outputs the setting reflection inhibition signal GPH as the Low signal in a period after completion of writing of the series of setting values from the AP 133 in the write bank 161.

As a result, if the setting reflection inhibition signal GPH when the vertical synchronization signal Vsync is generated is High, since the setting value is being written in the write bank 161, the copy control unit 163 stops and inhibits copy control of the setting value to the read bank 162.

Conversely, if the setting reflection inhibition signal GPH when the vertical synchronization signal Vsync is generated is Low, the copy control unit 163 executes copy control of the setting value to the read bank 162 since the setting value has been written in the complete state in the write bank 161.

As a result, the setting value copied from the write bank 161 to the read bank 162 is inhibited from being divided by the vertical synchronization signal Vsync.

The timing generator 157 generates the vertical synchronization signal Vsync and supplies the vertical synchronization signal Vsync to the copy control unit 163 of the register 156 of the image sensor 131.

Note that, in the present specification, the description will be given on the assumption that the setting reflection inhibition signal GPH output from the GPH adjustment unit 164 is High active indicating that, as described above, a period when the signal is High is a period in which the series of setting values from the AP 133 is written in the write bank 161, and the setting reflection inhibition signal GPH is in a state of being effectively generated.

However, this is merely an example, and for example, the setting reflection inhibition signal GPH output from the GPH adjustment unit 164 may be Low active indicating that a period when the signal is Low is a period in which the series of setting values from the AP 133 is written in the write bank 161, and the setting reflection inhibition signal GPH is in a state of being effectively generated.

However, in the case of Low active, a relationship between High and Low of the setting reflection inhibition signal GPH in the present specification is reversed.

Furthermore, similarly to the setting reflection inhibition signal GPH, the vertical synchronization signal Vsync generated by the timing generator 157 may be either High active indicating that the vertical synchronization signal Vsync is in a state of being effectively generated when it is High, or Low active indicating that the vertical synchronization signal Vsync is in a state of being effectively generated when it is Low.

<Configuration Example of Companion Chip>

Next, a configuration example of the companion chip 132 will be described with reference to FIG. 4.

The companion chip 32 includes a signal processing unit 171 and a register 172.

The signal processing unit 171 performs signal processing of a corresponding processing content on the image data supplied from the image sensor 131 on the basis of the setting value supplied from the AP 133 via the register 172, and outputs the image data to the AP 133.

The register 172 operates on the basis of the vertical synchronization signal Vsync supplied from the timing generator 157 of the image sensor 131, and supplies information of the setting value supplied from the AP 133 to the signal processing unit 153.

More specifically, the register 172 includes a write bank 181, read banks 182-0 to 182-N, a copy control unit 183, and a selection unit 184.

The write bank 181 temporarily stores the setting value supplied from the AP 133 via the I2C or the like.

The read banks 182-0 to 182-N (N is greater than or equal to 1: that is, the number of read banks 182 is at least two or more) are controlled by the copy control unit 183, and sequentially copy and store the information of the setting value stored in the write bank 181 on the basis of the vertical synchronization signal Vsync.

Note that, in a case where it is not necessary to distinguish the read banks 182-0 to 182-N from each other, the read banks are simply referred to as read banks 182, and the other components are similarly referred to.

The copy control unit 183 performs control to sequentially copy the setting value stored in the write bank 181 to the read banks 182-0 to 182-N on the basis of the vertical synchronization signal Vsync.

More specifically, the copy control unit 183 includes a counter n (n=0, 1, 2, . . . . N) for managing the read banks 182-0 to 182-N serving as copy destinations of the setting value stored in the write bank 181, and outputs a copy control signal to copy the setting value to the corresponding read bank 182-*n* by performing increment by 1 on the basis of the vertical synchronization signal Vsync. In response to this, the setting value stored in the write bank 181 is copied to the corresponding read bank 182-*n*.

Note that the maximum value N of the counter n corresponds to the number of read banks 182-0 to 182-N.

The selection unit 184 reads the group number GN stored in the image data supplied from the image sensor 131, reads the setting value stored in a corresponding one of the read banks 182 among the read banks 182-0 to 182-N, and supplies the read setting value to the signal processing unit 171.

The group number GN is a number for identifying the order in which the setting value is supplied from the AP 133, and the setting values from the AP 133 are stored in order also in the read banks 182-0 to 182-N.

For this reason, the selection unit 184 reads the setting value stored in the read bank 182-*n* (n=GN) corresponding to the group number GN and supplies the read value to the signal processing unit 171, so that the setting value corresponding to the processing content of the signal processing performed in the image sensor 131 on the currently supplied image data is read to the signal processing unit 171.

As a result, it is possible to always achieve consistency between the setting value for setting the processing content corresponding to the signal processing performed in the signal processing unit 153 of the image sensor 131 and the setting value corresponding to the processing content of the signal processing performed in the signal processing unit 171 of the companion chip 32.

<Operation Example in Case where there are Two Read Banks>

Next, as an operation example by the imaging device 111 and the companion chip 132 described with reference to FIGS. 3 and 4, an operation example in a case where there are two (N=1) read banks 182 will be described with reference to a timing chart of FIG. 5.

Figure 5:
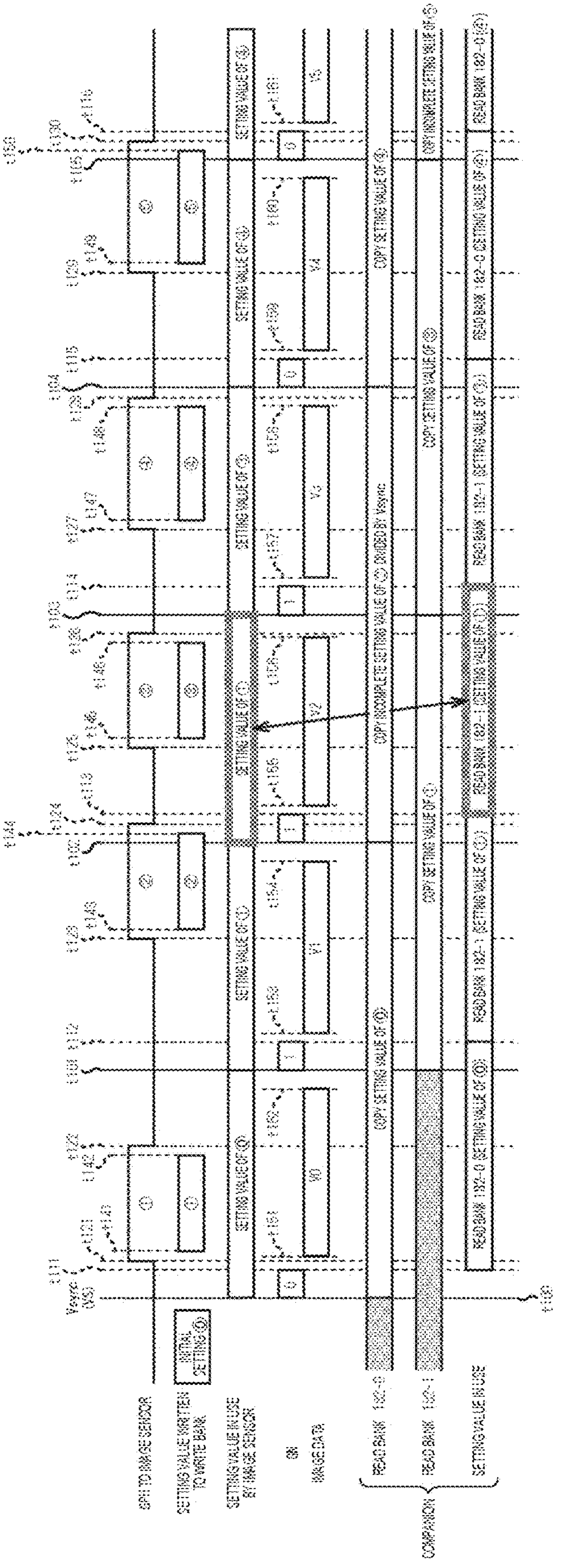
FIG. 5 is a timing chart illustrating an operation example in a case where there are two read banks in the companion chip.

Note that, FIG. 5 illustrates, from the top, the setting reflection inhibition signal GPH of the image sensor 131, a setting value indicating a setting value written in the write banks 161 and 181, a setting value being used in the signal processing unit 153, a value of the group number GN, and image data (V0, V1, . . . ) to be subjected to signal processing.

Furthermore, below that, illustrated are setting values respectively written in the read banks 182-0 and 182-1 of the companion chip 132 and a setting value being used in the signal processing unit 171.

Moreover, in FIG. 5, what is drawn by a numerical value in a circle is a number for identifying the order of the setting values, and for example, if the inside of the circle is 0, the setting value is the 0th setting value supplied from the AP 133 (that is, a setting value serving as an initial value), and for example, if the inside of the circle is 1, the setting value is the first setting value supplied from the AP 133.

That is, before time t100, the write banks 161 and 181 are also in a state where the 0th setting value, that is, the initial setting value (initial setting) is stored. Furthermore, it is assumed that both the counter g of the CPU subsystem 155 and the counter n of the copy control unit 183 have an initial value of 0.

When the vertical synchronization signal Vsync is generated at the time t100 (when Vsync=High), in the image sensor 131, since the setting reflection inhibition signal GPH is the Low signal, the copy control unit 163 outputs a copy control signal for performing control to copy the 0th setting value of the write bank 161 to the read bank 162.

At this time, from the time t100 to time t111, the CPU subsystem 155 sets the group number GN to 0, which is the initial value of the counter g, on the basis of the copy control signal from the copy control unit 163, and outputs the group number GN to the image output control unit 154.

As a result, the 0th setting value is copied from the write bank 161 to the read bank 162, and the signal processing unit 153 performs signal processing using the 0th setting value on the image data V0 from time t151 to time t152 and supplies the processed image data V0 to the image output control unit 154.

The image output control unit 154 converts the data format of the image data V0, stores the group number GN=0 supplied from the CPU subsystem 155, and outputs the data to the companion chip 132.

In response to this, in the companion chip 132, the copy control unit 183 outputs a copy control signal for performing control to copy the 0th setting value of the write bank 181 to the read bank 182-0 corresponding to 0 that is the initial value of the counter n.

For this reason, since the 0th setting value is copied to the read bank 182-0 and the group number GN=0 is stored in the image data V0, after the time t111, the 0th setting value of the read bank 182-0 corresponding to the group number GN=0 is read by the selection unit 184, and the signal processing unit 171 performs signal processing using the 0th setting value on the image data V0.

Here, the counters g and n are incremented by 1 and respectively set to 1.

Subsequently, when the setting reflection inhibition signal GPH of the image sensor 131 is set to High from time t121 to time t122, the first setting value from the AP 133 is written to the write banks 161 and 181 from time t141 to time t142.

When the vertical synchronization signal Vsync is generated at time t101, in the image sensor 131, since the setting reflection inhibition signal GPH is the Low signal, the copy control unit 163 outputs a copy control signal for performing control to copy the first setting value of the write bank 161 to the read bank 162.

At this time, from time t101 to time t112, the CPU subsystem 155 sets the group number GN to 1, which is the value of the counter g, on the basis of the copy control signal from the copy control unit 163, and outputs the group number GN to the image output control unit 154.

As a result, the first setting value is copied from the write bank 161 to the read bank 162, and the signal processing unit 153 performs signal processing using the first setting value on the image data V1 from time t153 to time t154 and supplies the processed image data V1 to the image output control unit 154.

The image output control unit 154 converts the data format of the image data V1, stores the group number GN=1 supplied from the CPU subsystem 155 in the image data, and outputs the data to the companion chip 132.

In response to this, in the companion chip 132, the copy control unit 183 outputs a copy control signal for performing control to copy the first setting value of the write bank 181 to the read bank 182-1 corresponding to the value=1 of the counter n.

For this reason, since the first setting value is copied to the read bank 182-1 and the group number GN=1 is stored in the image data V1, after the time t112, the first setting value of the read bank 182-1 corresponding to the group number GN=1 is read by the selection unit 184, and the signal processing unit 171 performs signal processing using the first setting value on the image data V1.

Here, the counters g and n are incremented by 1, but since both are the maximum value (N=1), the counters g and n are initialized and set to 0.

Subsequently, when the setting reflection inhibition signal GPH of the image sensor 131 is set to High from time t123 to time t124, the second setting value from the AP 133 is written to the write banks 161 and 181 from time t143 to time t144.

When the vertical synchronization signal Vsync is generated at time t102, in the image sensor 131, since the setting reflection inhibition signal GPH is the High signal, the copy control unit 163 does not output the copy control signal so as not to copy the second setting value of the write bank 161 to the read bank 162.

At this time, from the time t101 to time t112, since there is no copy control signal from the copy control unit 163, the CPU subsystem 155 keeps the value of the group number GN at 1 and outputs it to the image output control unit 154.

As a result, the second setting value is not copied from the write bank 161 to the read bank 162, and the signal processing unit 153 performs signal processing using the first setting value stored in the read bank 162 on the image data V2 from time t155 to time t156 similarly to the previous time, and supplies the processed image data V2 to the image output control unit 154.

The image output control unit 154 converts the data format of the image data V2, stores the group number GN=1 supplied from the CPU subsystem 155 in the image data, and outputs the data to the companion chip 132.

In response to this, in the companion chip 132, the copy control unit 183 outputs a copy control signal for performing control to copy the second setting value of the write bank 181 to the read bank 182-0 corresponding to the value=0 of the counter n. However, the second setting value is incomplete since it is divided by the vertical synchronization signal Vsync.

For this reason, the second setting value is copied to the read bank 182-0, but since the group number GN=1 is stored in the image data, also after time t113, the first setting value of the read bank 182-1 corresponding to the group number GN=1 is read by the selection unit 184, and the signal processing unit 171 performs signal processing using the first setting value on the image data V2.

Here, the counters g and n are incremented by 1 and set to 1.

Subsequently, when the setting reflection inhibition signal GPH of the image sensor 131 is set to High from time t125 to time t126, the third setting value from the AP 133 is written to the write banks 161 and 181 from time t145 to time t146.

When the vertical synchronization signal Vsync is generated at time t103, in the image sensor 131, since the setting reflection inhibition signal GPH is the Low signal, the copy control unit 163 outputs a copy control signal for performing control to copy the third setting value of the write bank 161 to the read bank 162.

At this time, from the time t103 to time t114, the CPU subsystem 155 sets the group number GN to 1, which is the value of the counter g, on the basis of the copy control signal from the copy control unit 163, and outputs the group number GN to the image output control unit 154.

As a result, the third setting value is copied from the write bank 161 to the read bank 162, and the signal processing unit 153 performs signal processing using the third setting value on the image data V3 from time t157 to time t158 and supplies the processed image data V3 to the image output control unit 154.

The image output control unit 154 stores the group number GN=1 supplied from the CPU subsystem 155 in the image data, converts the data format, and outputs the data to the companion chip 132.

In response to this, in the companion chip 132, the copy control unit 183 outputs a copy control signal for performing control to copy the third setting value of the write bank 181 to the read bank 182-1 corresponding to the value=1 of the counter n.

For this reason, since the third setting value is copied to the read bank 182-1 and the group number GN=1 is stored in the image data, after the time t114, the third setting value of the read bank 182-1 corresponding to the group number GN=1 is read by the selection unit 184 and the signal processing unit 171 performs signal processing using the third setting value on the image data V3.

Here, the counters g and n are incremented by 1, but since both are the maximum value (N=1), the counters g and n are initialized and set to 0.

Subsequently, when the setting reflection inhibition signal GPH of the image sensor 131 is set to High from time t127 to time t128, the fourth setting value from the AP 133 is written to the write banks 161 and 181 from time t147 to time t148.

When the vertical synchronization signal Vsync is generated at time t104, in the image sensor 131, since the setting reflection inhibition signal GPH is the Low signal, the copy control unit 163 outputs a copy control signal for performing control to copy the fourth setting value of the write bank 161 to the read bank 162.

At this time, from the time t104 to time t115, the CPU subsystem 155 sets the group number GN to 0, which is the value of the counter g, on the basis of the copy control signal from the copy control unit 163, and outputs the group number GN to the image output control unit 154.

As a result, the fourth setting value is copied from the write bank 161 to the read bank 162, and the signal processing unit 153 performs signal processing using the fourth setting value on the image data V4 from time t159 to time t160 and supplies the processed image data V4 to the image output control unit 154.

The image output control unit 154 stores the group number GN=0 supplied from the CPU subsystem 155 in the image data, converts the data format, and outputs the data to the companion chip 132.

In response to this, in the companion chip 132, the copy control unit 183 outputs a copy control signal for performing control to copy the fourth setting value of the write bank 181 to the read bank 182-0 corresponding to the value=0 of the counter n.

For this reason, since the fourth setting value is copied to the read bank 182-0 and the group number GN=0 is stored in the image data, after the time t115, the fourth setting value of the read bank 182-0 corresponding to the group number GN=0 is read by the selection unit 184 and the signal processing unit 171 performs signal processing using the fourth setting value on the image data V4.

Here, the counters g and n are incremented by 1 and set to 1.

Thereafter, similar processing is repeated.

By the processing as described above, as indicated by the arrow in FIG. 5, even if the second setting value is divided by the vertical synchronization signal Vsync at the time t102, the image sensor 131 and the companion chip 132 can perform signal processing of a processing content corresponding to the same setting value on the same image data, and it is possible to inhibit inconsistency in the setting values.

<Operation Example in Case where there are Four Read Banks>

Next, as an operation example by the imaging device 111 and the companion chip 132 described with reference to FIGS. 3 and 4, an operation example in a case where there are four (N=3) read banks 182 will be described with reference to a timing chart of FIG. 6.

Figure 6:
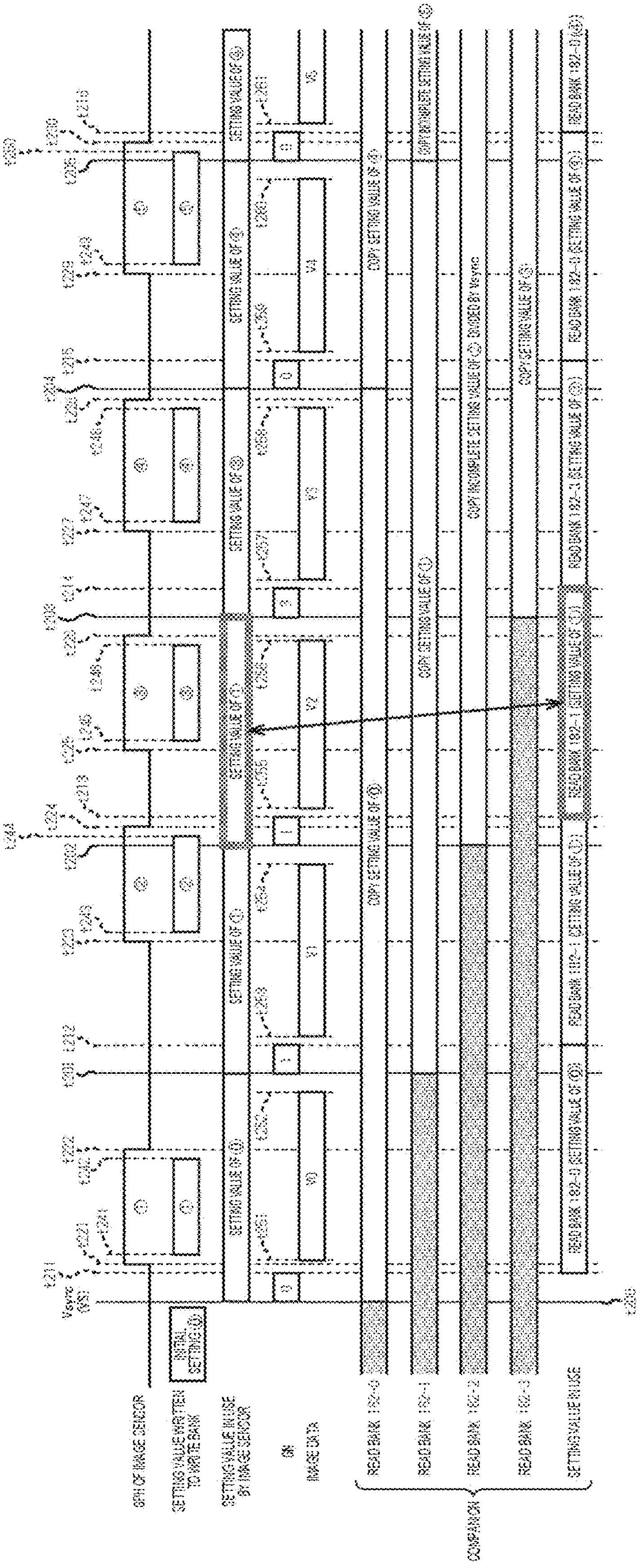
FIG. 6 is a timing chart illustrating an operation example in a case where there are four read banks in the companion chip.

Note that, FIG. 6 illustrates, from the top, the setting reflection inhibition signal GPH of the image sensor 131, a setting value indicating a setting value written in the write banks 161 and 181, a setting value being used in the signal processing unit 153, a value of the group number GN, image data (V0, V1, . . . ) to be subjected to the signal processing, setting values respectively written in the read banks 182-0 to 182-3 of the companion chip 132, and a setting value being used in the signal processing unit 171.

Furthermore, in FIG. 6, what is drawn by a numerical value in a circle is a number for identifying the setting value, and for example, if the inside of the circle is 0, the setting value is the 0th setting value supplied from the AP 133 (that is, a setting value serving as an initial value), and for example, if the inside of the circle is 1, the setting value is the first setting value supplied from the AP 133.

That is, before time t200, the write banks 161 and 181 also stores the 0th setting value, that is, the initial value of the setting value. Furthermore, it is assumed that both the counter g of the CPU subsystem 155 and the counter n of the copy control unit 183 have an initial value of 0.

When the vertical synchronization signal Vsync is generated at the time t200, in the image sensor 131, since the setting reflection inhibition signal GPH is the Low signal, the copy control unit 163 outputs a copy control signal for performing control to copy the 0th setting value of the write bank 161 to the read bank 162.

At this time, from the time t200 to time t211, the CPU subsystem 155 sets the group number GN to 0, which is the initial value of the counter g, on the basis of the copy control signal from the copy control unit 163, and outputs the group number GN to the image output control unit 154.

As a result, the 0th setting value is copied from the write bank 161 to the read bank 162, and the signal processing unit 153 performs signal processing using the 0th setting value on the image data V0 from time t251 to time t252 and supplies the processed image data V0 to the image output control unit 154.

The image output control unit 154 converts the data format of the image data V0, stores the group number GN=0 supplied from the CPU subsystem 155, and outputs the data to the companion chip 132.

In response to this, in the companion chip 132, the copy control unit 183 outputs a copy control signal for performing control to copy the 0th setting value of the write bank 181 to the read bank 182-0 corresponding to the initial value of the counter n.

For this reason, since the 0th setting value is copied to the read bank 182-0 and the group number GN=0 is stored in the image data, after the time t211, the 0th setting value of the read bank 182-0 corresponding to the group number GN=0 is read by the selection unit 184 and the signal processing unit 171 performs signal processing using the 0th setting value on the image data V0.

Here, the counters g and n are incremented by 1 and respectively set to 1.

Subsequently, when the setting reflection inhibition signal GPH of the image sensor 131 is set to High from time t221 to time t222, the first setting value from the AP 133 is written to the write banks 161 and 181 from time t241 to time t242.

When the vertical synchronization signal Vsync is generated at time t201, in the image sensor 131, since the setting reflection inhibition signal GPH is the Low signal, the copy control unit 163 outputs a copy control signal for performing control to copy the first setting value of the write bank 161 to the read bank 162.

At this time, from the time t201 to time t212, the CPU subsystem 155 sets the group number GN to 1, which is the value of the counter g, on the basis of the copy control signal from the copy control unit 163, and outputs the group number GN to the image output control unit 154.

As a result, the first setting value is copied from the write bank 161 to the read bank 162, and the signal processing unit 153 performs signal processing using the first setting value on the image data V1 from time t153 to time t154 and supplies the processed image data V1 to the image output control unit 154.

The image output control unit 154 converts the data format of the image data V1, stores the group number GN=1 supplied from the CPU subsystem 155, and outputs the data to the companion chip 132.

In response to this, in the companion chip 132, the copy control unit 183 outputs a copy control signal for performing control to copy the first setting value of the write bank 181 to the read bank 182-1 corresponding to the value=1 of the counter n.

For this reason, since the first setting value is copied to the read bank 182-1 and the group number GN=1 is stored in the image data, after the time t212, the first setting value of the read bank 182-1 corresponding to the group number GN=1 is read by the selection unit 184 and the signal processing unit 171 performs signal processing using the first setting value on the image data V1.

Here, the counters g and n are incremented by 1 and set to 2.

Subsequently, when the setting reflection inhibition signal GPH of the image sensor 131 is set to High from time t223 to time t224, the second setting value from the AP 133 is written to the write banks 161 and 181 from time t243 to time t244.

When the vertical synchronization signal Vsync is generated at time t202, in the image sensor 131, since the setting reflection inhibition signal GPH is the High signal, the copy control unit 163 does not output the copy control signal so as not to copy the second setting value of the write bank 161 to the read bank 162.

At this time, from the time t202 to time t213, since there is no copy control signal from the copy control unit 163, the CPU subsystem 155 keeps the value of the group number GN at 1 and outputs it to the image output control unit 154.

As a result, the second setting value is not copied from the write bank 161 to the read bank 162, and the signal processing unit 153 performs signal processing using the first setting value on the image data V2 from time t255 to time t256 similarly to the previous time, and supplies the processed image data V2 to the image output control unit 154.

The image output control unit 154 converts the data format of the image data V2, stores the group number GN=1 supplied from the CPU subsystem 155 in the image data, and outputs the data to the companion chip 132.

In response to this, in the companion chip 132, the copy control unit 183 outputs a copy control signal for performing control to copy the second setting value of the write bank 181 to the read bank 182-2 corresponding to the value=2 of the counter n. However, the second setting value is incomplete since it is divided by the vertical synchronization signal Vsync.

For this reason, the second setting value is copied to the read bank 182-2, but since the group number GN=1 is stored in the image data, also after the time t213, the first setting value of the read bank 182-1 corresponding to the group number GN=1 is read by the selection unit 184, and the signal processing unit 171 performs signal processing using the first setting value on the image data V2.

Here, the counters g and n are incremented by 1 and set to 3.

Subsequently, when the setting reflection inhibition signal GPH of the image sensor 131 is set to High from time t225 to time t226, the third setting value from the AP 133 is written to the write banks 161 and 181 from time t245 to time t246.

When the vertical synchronization signal Vsync is generated at time t203, in the image sensor 131, since the setting reflection inhibition signal GPH is the Low signal, the copy control unit 163 outputs a copy control signal for performing control to copy the third setting value of the write bank 161 to the read bank 162.

At this time, from the time t203 to time t214, the CPU subsystem 155 sets the group number GN to 3, which is the value of the counter g, on the basis of the copy control signal from the copy control unit 163, and outputs the group number GN to the image output control unit 154.

As a result, the third setting value is copied from the write bank 161 to the read bank 162, and the signal processing unit 153 performs signal processing using the third setting value on the image data V3 from time t257 to time t258 and supplies the processed image data V3 to the image output control unit 154.

The image output control unit 154 converts the data format of the image data V3, stores the group number GN=3 supplied from the CPU subsystem 155 in the image data, and outputs the data to the companion chip 132.

In response to this, in the companion chip 132, the copy control unit 183 outputs a copy control signal for performing control to copy the third setting value of the write bank 181 to the read bank 182-3 corresponding to the value=3 of the counter n.

For this reason, since the third setting value is copied to the read bank 182-3 and the group number GN=3 is stored in the image data, after the time t214, the third setting value of the read bank 182-3 corresponding to the group number GN=3 is read by the selection unit 184 and the signal processing unit 171 performs signal processing using the third setting value on the image data V3.

Here, the counters g and n are incremented by 1, but since both are the maximum value (N=3), the counters g and n are initialized and set to 0.

Subsequently, when the setting reflection inhibition signal GPH of the image sensor 131 is set to High from time t227 to time t228, the fourth setting value from the AP 133 is written to the write banks 161 and 181 from time t247 to time t248.

When the vertical synchronization signal Vsync is generated at time t204, in the image sensor 131, since the setting reflection inhibition signal GPH is the Low signal, the copy control unit 163 outputs a copy control signal for performing control to copy the fourth setting value of the write bank 161 to the read bank 162.

At this time, from the time t204 to time t215, the CPU subsystem 155 sets the group number GN to 0, which is the value of the counter g, on the basis of the copy control signal from the copy control unit 163, and outputs the group number GN to the image output control unit 154.

As a result, the fourth setting value is copied from the write bank 161 to the read bank 162, and the signal processing unit 153 performs signal processing using the fourth setting value on the image data V4 from time t259 to time t260 and supplies the processed image data V4 to the image output control unit 154.

The image output control unit 154 converts the data format of the image data V4, stores the group number GN=0 supplied from the CPU subsystem 155 in the image data, and outputs the data to the companion chip 132.

In response to this, in the companion chip 132, the copy control unit 183 outputs a copy control signal for performing control to copy the fourth setting value of the write bank 181 to the read bank 182-0 corresponding to the value=0 of the counter n.

For this reason, since the fourth setting value is copied to the read bank 182-0 and the group number GN=0 is stored in the image data, after the time t215, the fourth setting value of the read bank 182-0 corresponding to the group number GN=0 is read by the selection unit 184 and the signal processing unit 171 performs signal processing using the fourth setting value on the image data V4.

Here, the counters g and n are incremented by 1 and set to 1.

Thereafter, similar processing is repeated.

By the processing as described above, as indicated by the arrow in FIG. 6, even if the second setting value is divided by the vertical synchronization signal Vsync at the time t202, the image sensor 131 and the companion chip 132 can perform signal processing of a processing content corresponding to the same setting value on the same image data, and it is possible to inhibit inconsistency in the setting values.

That is, to summarize the above, in the image sensor 131, the register 156 writes the setting value from the AP 133 to the write bank 161, and copies the setting value of the write bank 161 to the read bank 162 when it is a timing at which the vertical synchronization signal Vsync is supplied and the setting reflection inhibition signal GPH is LOW.

The signal processing unit 153 reads the setting value of the read bank 162, performs signal processing of the corresponding processing content on the image data, and outputs the processed image data to the image output control unit 154.

The CPU subsystem 155 increments the counter g according to the number of the read banks 182-N of the companion chip 132 in accordance with the vertical synchronization signal Vsync, and when the setting value of the write bank 161 is written to the read bank 162, sets the value of the counter g at that time as the group number GN, and outputs the group number GN to the image output control unit 154.

The image output control unit 154 converts the format of the image data from the signal processing unit 153, stores the group number GN, and outputs the data to the companion chip 132.

In the companion chip 132, at the timing at which the vertical synchronization signal Vsync is supplied, the register 172 writes the setting value from the AP 133 to the write bank 181, and switches and copies the setting value of the write bank 181 in the order of the read banks 182-0 to 182-N.

The selection unit 184 reads the setting value from the read bank 182 corresponding to the group number GN stored in the image data among the read banks 182-0 to 182-N, and supplies the setting value to the signal processing unit 171.

The signal processing unit 171 performs signal processing of a processing content corresponding to the setting value supplied from the selection unit 184 on the image data and outputs the processed image data.

That is, in the image sensor 131 and the companion chip 132, every time the setting value is supplied from the AP 133, the counter g for setting the group number GN and the counter n for identifying the read banks 182-0 to 182-N in the register 172 of the companion chip 132 are incremented in synchronization with each other.

Furthermore, in the image sensor 131, the group number GN corresponding to the order in which the setting value used in the signal processing unit 153 is supplied from the AP 133 is set by the counter g and stored in the image data.

Moreover, in the companion chip 132, the setting values are stored in the read banks 182-0 to 182-N specified by the counter n corresponding to the order in which the setting value is supplied from the AP 133.

As a result, in the companion chip 132, the setting value stored in one of the read banks 182 corresponding to the group number GN stored in the image data supplied from the image sensor 131 is read and used in the signal processing unit 171.

Figure 4:
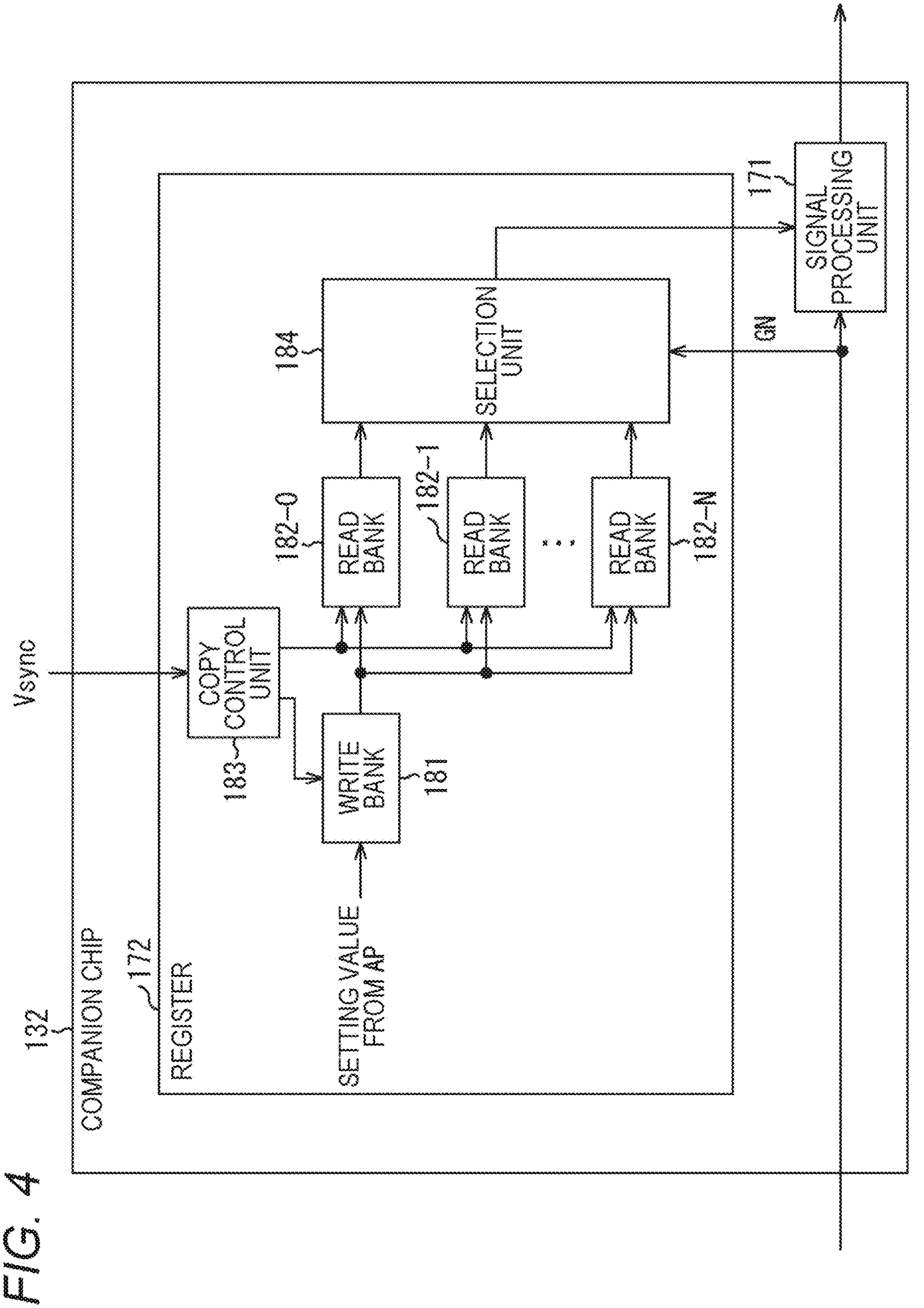
FIG. 4 is a diagram illustrating a configuration example of a companion chip in FIG. 3.

In other words, in the image sensor 131, as information for identifying the setting value used for the signal processing by the signal processing unit 153, the group number GN corresponding to the order in which the setting value is supplied from the AP 133 is stored in the image data, and in the companion chip 132, the read banks 182-0 to 182-N are managed with serial numbers assigned similarly to the reference numerals in FIG. 4, the setting values supplied from the AP 133 are stored in the order of the serial numbers in accordance with the counter n, and among the stored setting values, the setting value supplied from the AP 133 in the same order as the setting value used for the signal processing in the signal processing unit 153 identified by group number GN is used in the signal processing unit 171.

As a result, the signal processing unit 153 of the image sensor 131 and the signal processing unit 171 of the companion chip 132 can implement signal processing using the same setting value and having the same processing content.

As a result, the signal processing unit 153 of the image sensor 131 and the signal processing unit 171 in the companion chip 132 can perform signal processing based on the same setting value on the same image data, and it is possible to inhibit inconsistency in the setting values.

<Storage Example of Group Number GN>

<Part 1>

As described above, the image data supplied from the signal processing unit 153 is subjected to data format conversion by the image output control unit 154, and then the group number GN is stored in a converted data format.

For this reason, the group number GN can be stored in various positions according to the data format.

Figure 7:
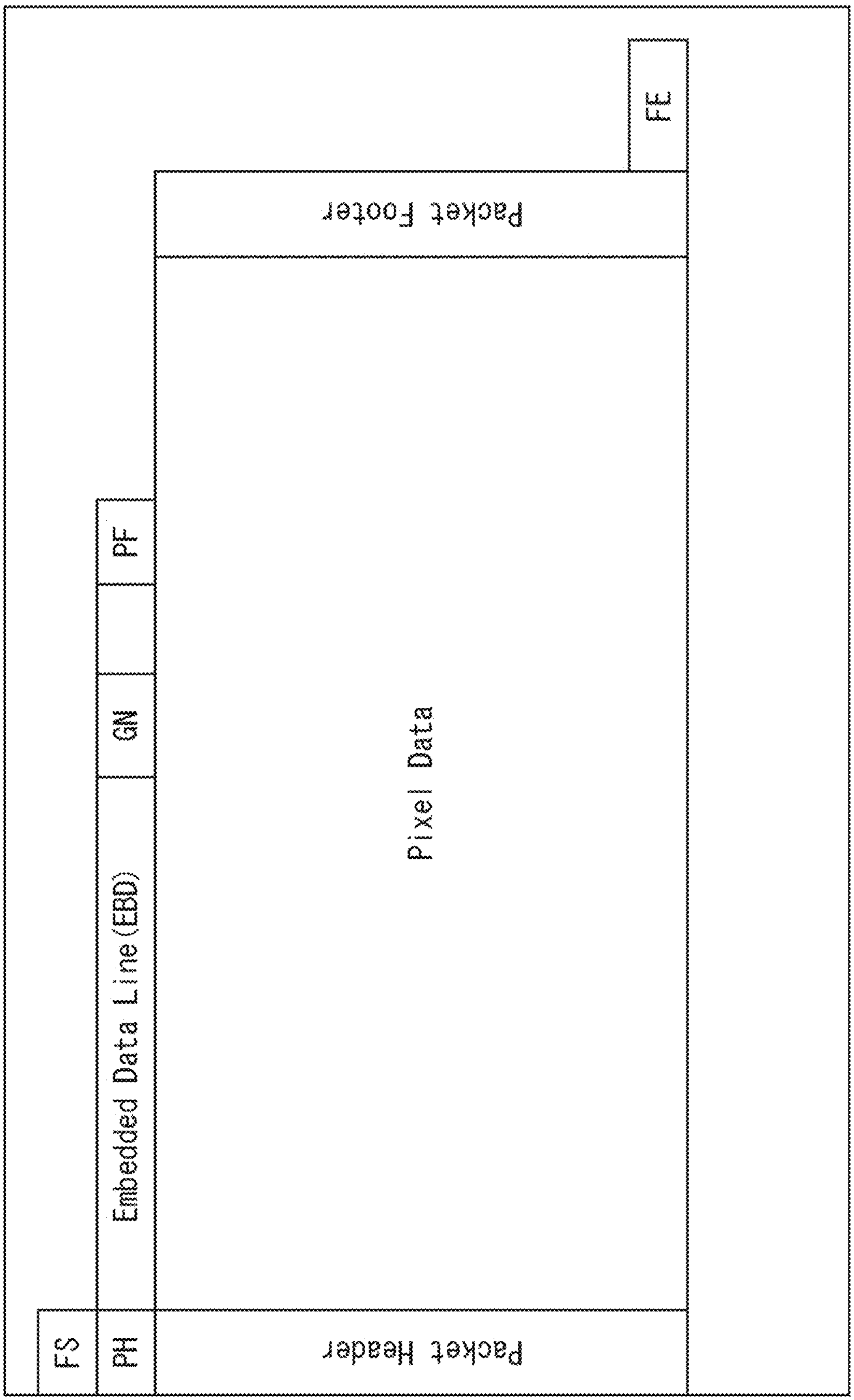
FIG. 7 is a diagram illustrating an example in which information on a group number is stored in an Embedded Data Line (EBD) in a data format of MIPI.

For example, in the data format of the MIPI, as illustrated in FIG. 7, the group number GN may be stored in an Embedded Data Line (EBD).

Note that, in the data format of the MIPI of FIG. 7, a file start (FS) is set at the uppermost stage, the embedded data line (EBD) including a packet header (PH) and a packet footer (PF) is set below the file start, a pixel area (Pixel Data) including a packet header (Packet Header) and a packet footer (Packet Footer) is set below the EBD, and finally, a file end (FE) is set.

The Embedded Data Line (EBD) includes, for example, setting information regarding imaging by the image sensor 131, such as a shutter speed, an aperture value, and a gain, but a reserve area is provided, and thus the group number GN may be stored as illustrated in FIG. 7.

<Part 2>

In the above, an example has been described in which the group number GN is provided in the Embedded Data Line (EBD), but the group number GN may be stored in the pixel area (Pixel Data).

Figure 8:
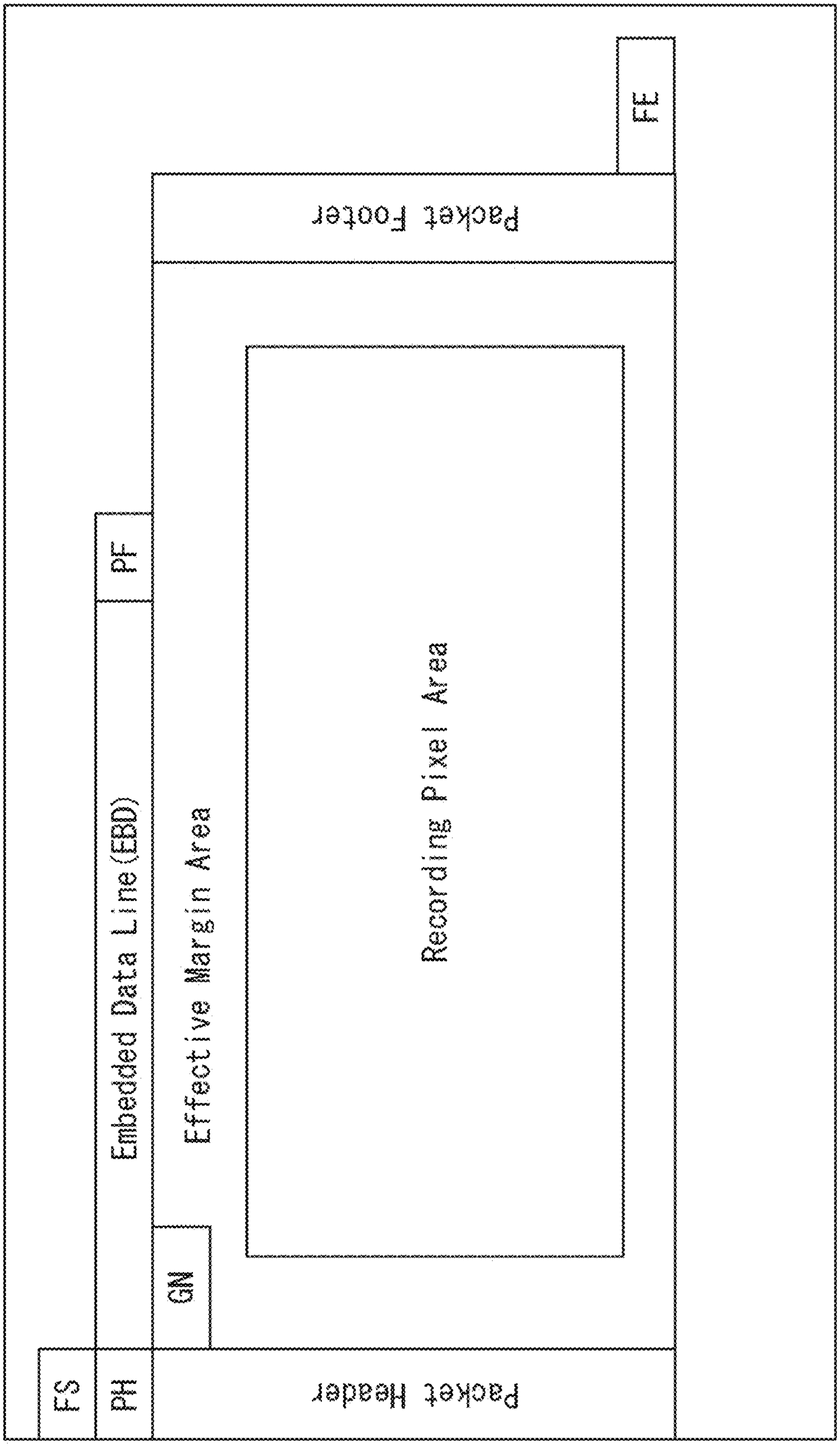
FIG. 8 is a diagram illustrating an example in which the information on the group number is stored in a margin pixel area (Effective Margin Area) in the data format of the MIPI.

FIG. 8 illustrates an example in which the group number GN is stored in the pixel area (Pixel Data) in the data format of the MIPI.

That is, as illustrated in FIG. 8, in the pixel area (Pixel Data), an effective pixel area (Recording Pixel Area) set near the center of the area and a margin pixel area (Effective Margin Area) set as a margin are provided.

As illustrated in FIG. 8, the group number GN may be set in the margin pixel area (Effective Margin Area) of the pixel area (Pixel Data).

<Part 3>

Since a user defined area can be added to the data format of the MIPI, the group number GN may be stored in the user defined area.

Figure 9:
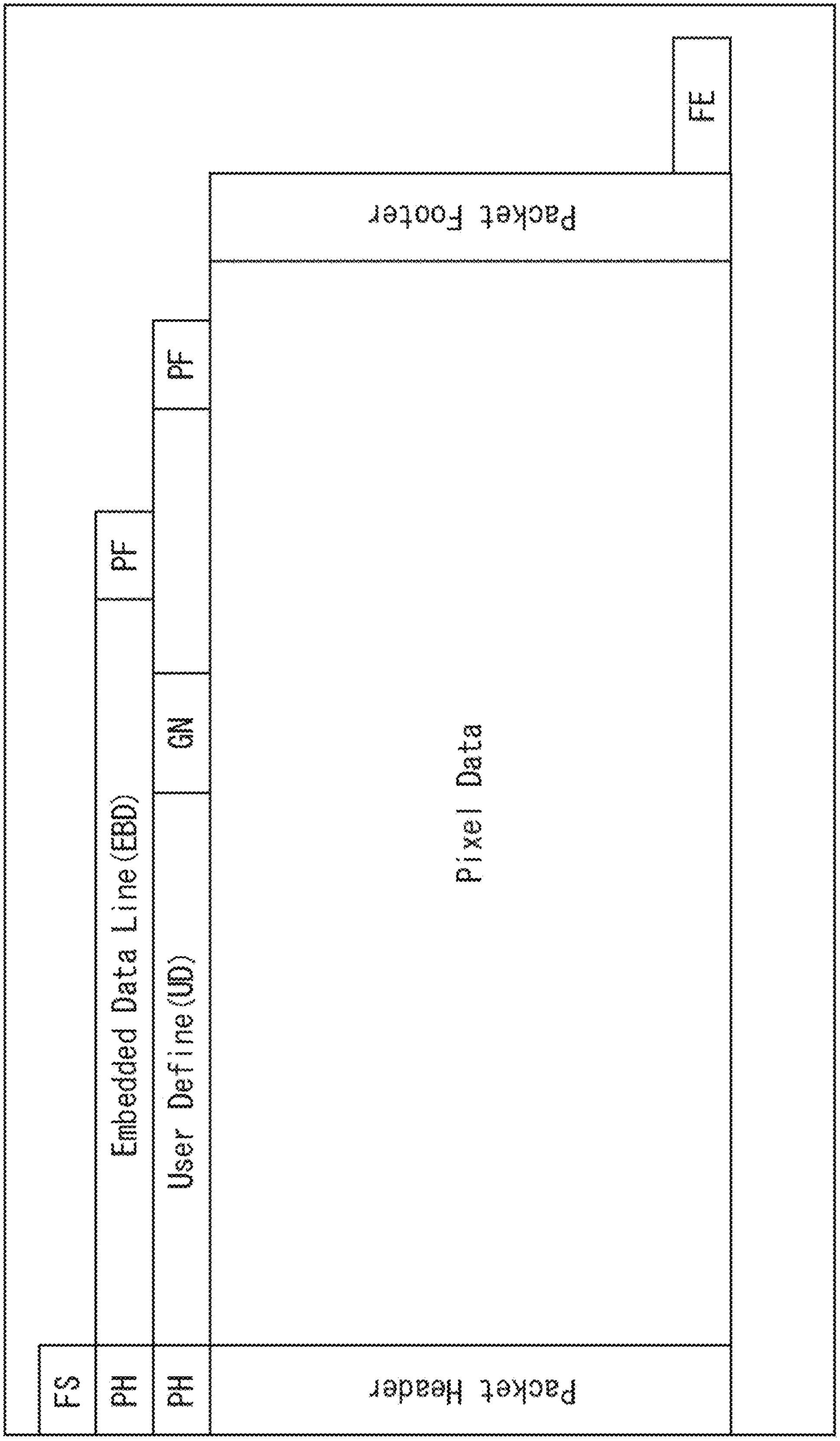
FIG. 9 is a diagram illustrating an example in which the information of the group number is stored in a user defined area (User Define (UD)) in the data format of the MIPI.

FIG. 9 illustrates an example in which the group number GN is stored in the user defined area (User Define (UD)) in the data format of the MIPI.

That is, as illustrated in FIG. 9, in the data format of the MIPI, the user defined area (UD) including a packet header (PH) and a packet footer (PF) is set between the Embedded Data Line (EBD) and the pixel area (Pixel Data).

As illustrated in FIG. 9, the group number GN may be stored in the user defined area (User Define (UD)).

<Part 4>

In the above, an example has been described in which the group number GN is stored in the data format of the MIPI, but other data formats may be used, and for example, the group number GN may be stored in the data format of the SLVS.

Figure 10:
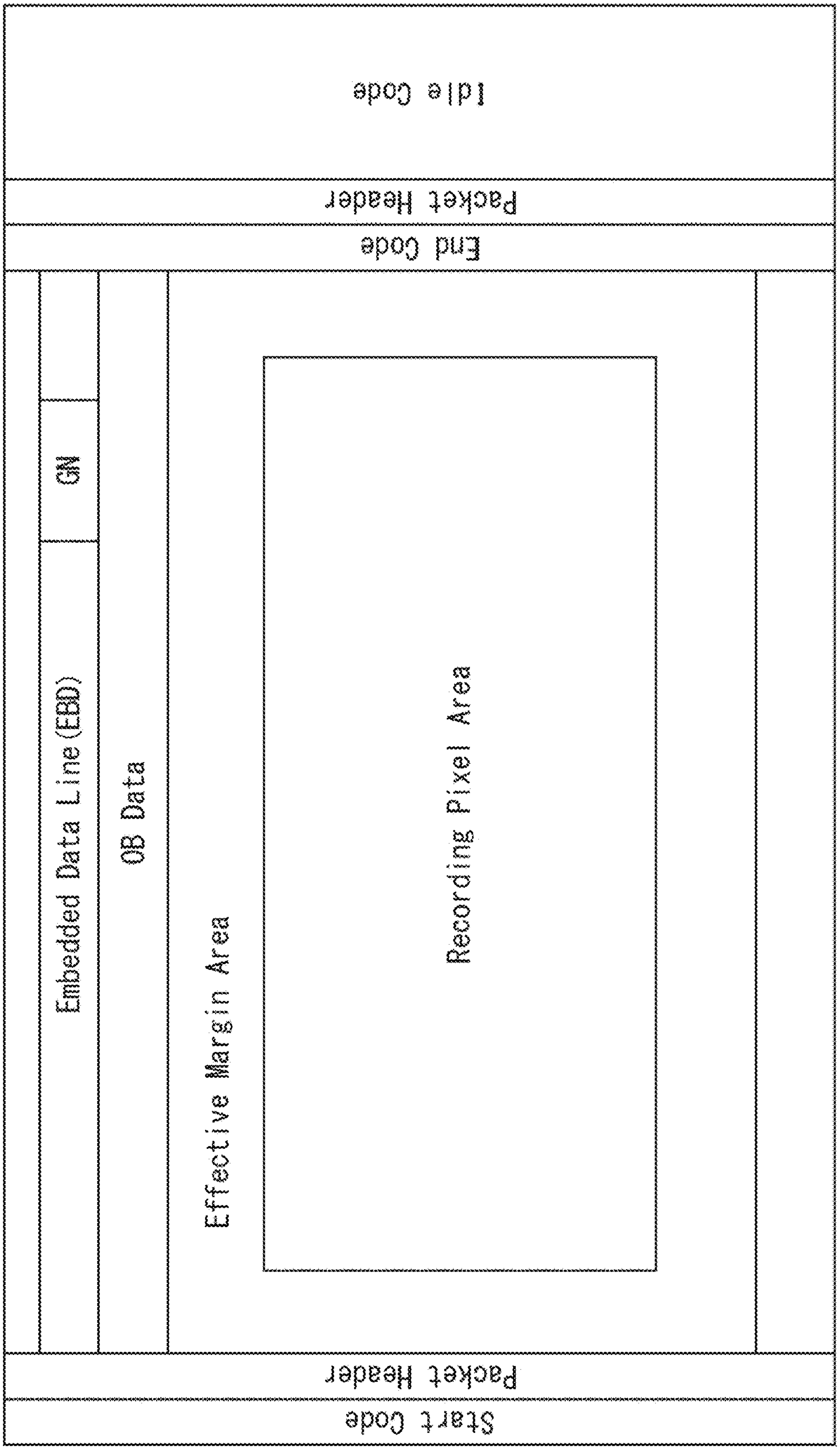
FIG. 10 is a diagram illustrating an example in which the information on the group number is stored in the Embedded Data Line (EBD) in a data format of SLVS.

FIG. 10 illustrates an example in which the group number GN is stored in the data format of the SLVS.

The SLVS includes, from the left in the figure, a start code (Start Code), a packet header (Packet Header), a data area, an end code (End Code), a packet footer (Packet Header), and an idle code (Idle Code).

Furthermore, in the data area, from the top in the figure, the Embedded Data Line (EBD), OB Data, and the pixel area are set.

Moreover, in the pixel area, the effective pixel area (Recording Pixel Area) and the margin pixel area (Effective Margin Area) set as the margin are provided.

As illustrated in FIG. 10, the group number GN may be stored in the Embedded Data Line (EBD) in the data format of the SLVS.

<Part 5>

In the above, an example has been described in which the group number GN is stored in the Embedded Data Line (EBD) in the data format of the SVLS, but the group number GN may be set in the margin pixel area (Effective Margin Area) of the pixel area.

Figure 11:
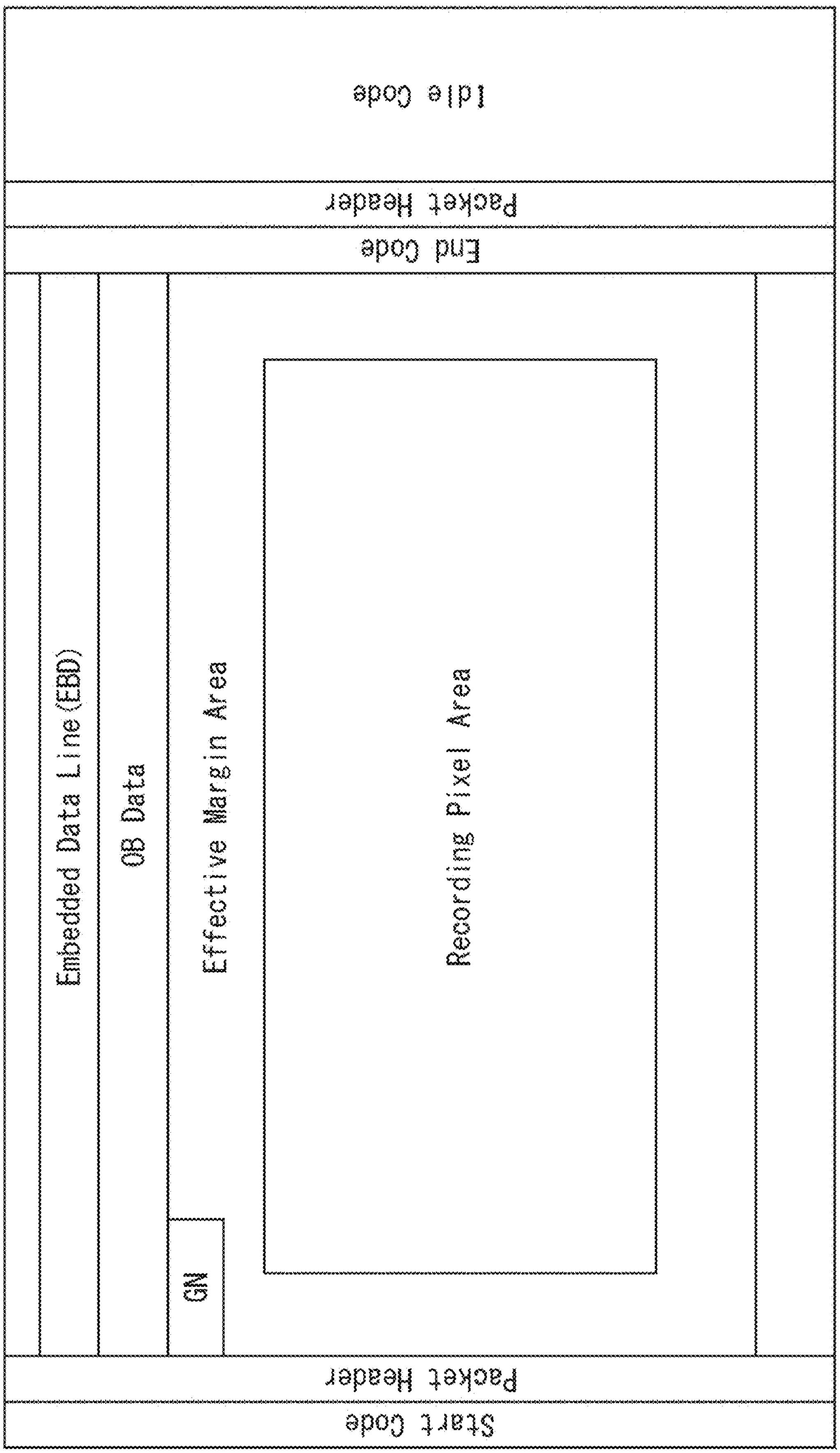
FIG. 11 is a diagram illustrating an example in which the information of the group number is stored in the margin pixel area (Effective Margin Area) in the data format of the SLVS.

That is, as illustrated in FIG. 11, the group number GN may be set in the margin pixel area (Effective Margin Area) of the pixel area (Pixel Data) in the data format of the SVLS.

<Processing by Image Sensor>

Figure 12:
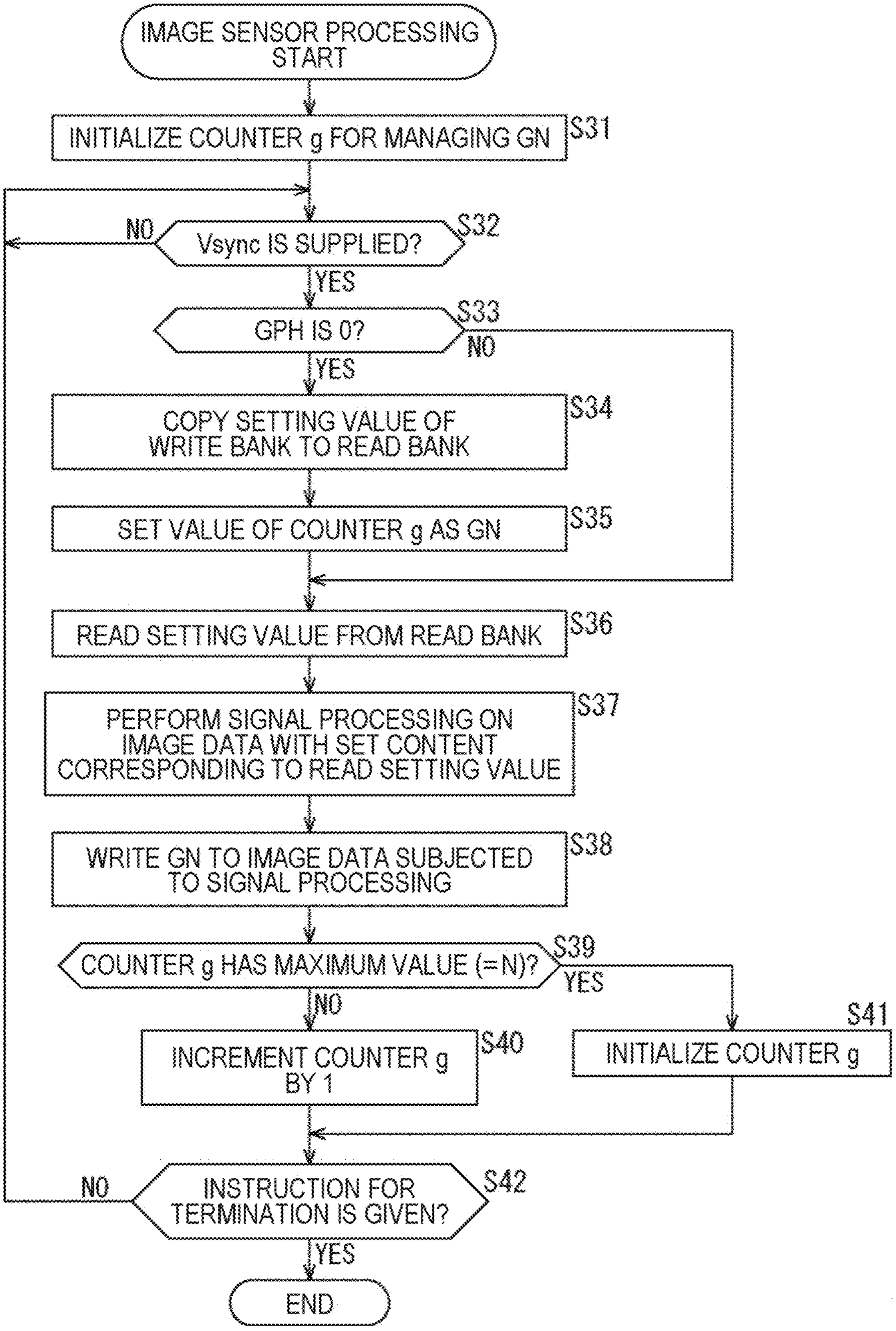
FIG. 12 is a flowchart illustrating processing by an image sensor.

Next, processing by the image sensor 131 will be described with reference to a flowchart of FIG. 12.

In step S31, the CPU subsystem 155 initializes the counter g for managing the group number GN to 0.

In step S32, the CPU subsystem 155 determines whether or not the vertical synchronization signal Vsync is supplied from the timing generator 157, and repeats similar processing until the vertical synchronization signal Vsync is supplied.

In step S32, in a case where the vertical synchronization signal Vsync is supplied from the timing generator 157, the processing proceeds to step S33.

In step S33, the copy control unit 163 determines whether or not the setting reflection inhibition signal GPH supplied from the GPH adjustment unit 164 is 0 (=Low).

Basically, writing of the setting value supplied from the AP 133 to the write bank 161 is processing performed at a control timing of the AP 133, but is processing assumed to be completed before the vertical synchronization signal Vsync is supplied. On this assumption, when the vertical synchronization signal Vsync is supplied and the writing of the setting value has been completed, the setting reflection inhibition signal GPH supplied from the GPH adjustment unit 164 is 0. However, when the vertical synchronization signal Vsync is supplied, the writing of the setting value to the write bank 161 may not have been completed, and in such a case, the setting reflection inhibition signal GPH is 1. That is, it is determined whether or not the setting reflection inhibition signal GPH is 0 when the vertical synchronization signal Vsync is supplied, whereby it is determined whether or not the writing of the setting value supplied from the AP 133 to the write bank 161 has been completed when the vertical synchronization signal Vsync is supplied.

In step S33, in a case where it is determined that the setting reflection inhibition signal GPH supplied from the GPH adjustment unit 164 is 0 (=Low), that is, in a case where it is determined that the writing has been completed, the processing proceeds to step S35.

In step S34, the copy control unit 163 outputs a copy control signal, copies the setting value stored in the write bank 161, and stores the copied setting value in the read bank 162.

In step S35, the CPU subsystem 155 sets the value of the counter g as the group number GN. Note that, in step S33, in a case where it is determined that the setting reflection inhibition signal GPH is not 0 (=Low), that is, the setting reflection inhibition signal GPH is 1 (=High), and it is determined that the writing of the setting value supplied from the AP 133 to the register 156 has not been completed, the processing of steps S34 and S35 is skipped, and copying of the setting value and setting of the group number GN are not performed.

In step S36, the signal processing unit 153 reads the setting value stored in the read bank 162.

In step S37, the signal processing unit 153 performs signal processing of a processing content corresponding to the read setting value and outputs the processed data to the image output control unit 154.

In step S38, the image output control unit 154 converts the image data subjected to the signal processing to a predetermined format, stores information of the group number GN, and outputs the data to the companion chip 132.

In step S39, the CPU subsystem 155 determines whether or not the counter g has the maximum value (the number of the read banks 182 of the companion chip 132=N).

In step S39, in a case where the counter g does not have the maximum value, the processing proceeds to step S40.

In step S40, the CPU subsystem 155 increments the counter g by 1.

On the other hand, in a case where the counter g has the maximum value in step S30, the processing proceeds to step S41.

In step S41, the CPU subsystem 155 initializes the counter g to 0.

In step S42, it is determined whether or not an instruction for termination is given, and in a case where the instruction for termination is not given, the processing returns to step S31, and the subsequent processing is repeated.

Then, in a case where it is determined in step S42 that the instruction for termination is given, the processing ends.

<Processing by Companion Chip>

Figure 13:
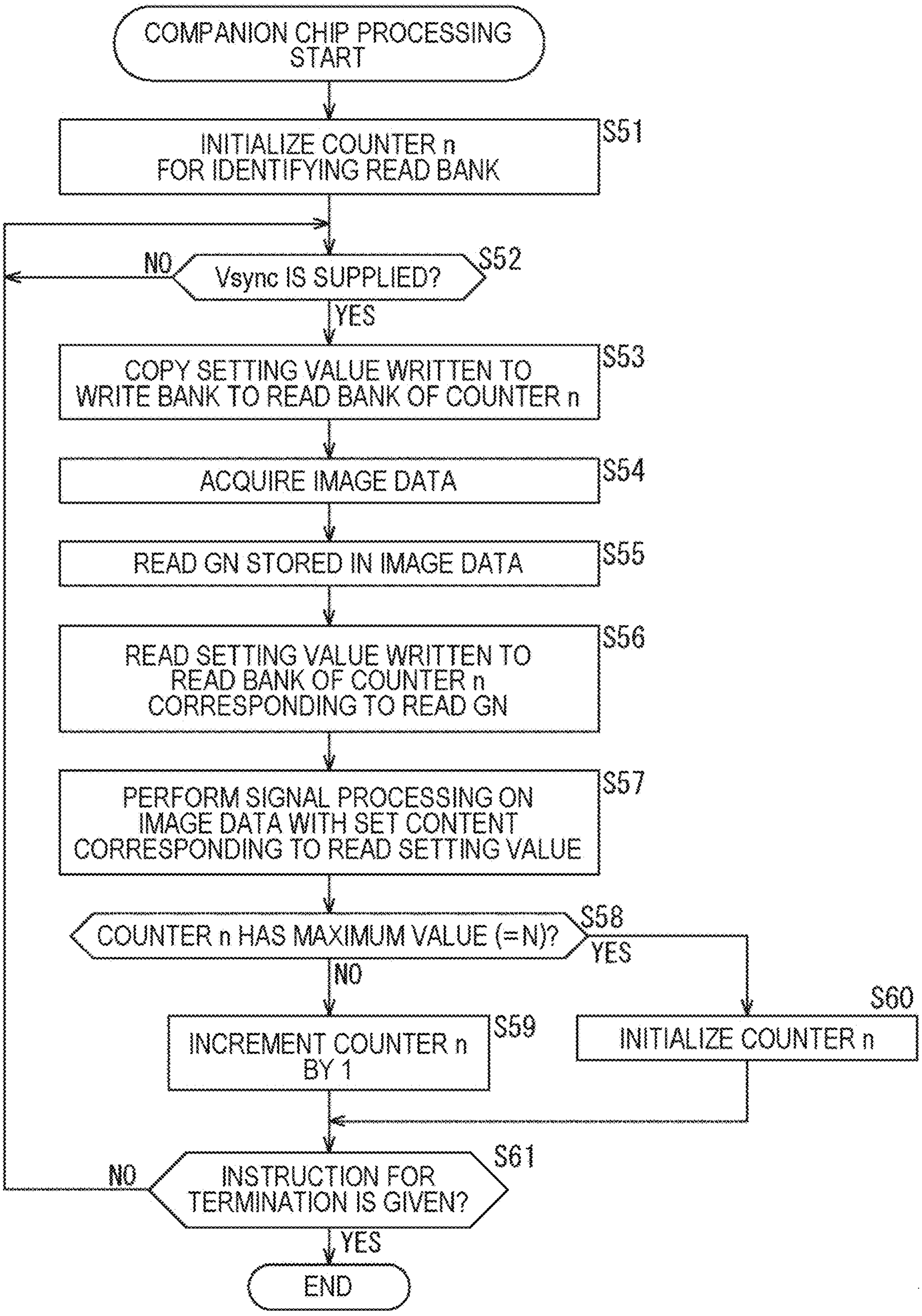
FIG. 13 is a flowchart illustrating processing by a companion chip.

Next, processing by the companion chip 132 will be described with reference to a flowchart of FIG. 13.

In step S51, the copy control unit 183 of the register 172 initializes the counter n for identifying the read banks 182-0 to 182-N to 0.

In step S52, the copy control unit 183 determines whether or not the vertical synchronization signal Vsync is supplied from the timing generator 157, and repeats similar processing until the vertical synchronization signal Vsync is supplied.

In step S52, in a case where the vertical synchronization signal Vsync is supplied from the timing generator 157, the processing proceeds to step S53.

In step S53, the copy control unit 183 outputs a copy control signal to copy and store the setting value written in the write bank 181 in the read bank 182-*n* corresponding to the counter n. Note that, basically, writing of the setting value supplied from the AP 133 to the write bank 181 is assumed to be processing performed at a control timing of the AP 133, similarly to the writing to the write bank 161.

In step S54, the signal processing unit 171 and the selection unit 184 acquire image data supplied from the image sensor 131.

In step S55, the selection unit 184 reads the group number GN stored in the image data.

In step S56, the selection unit 184 reads the setting value stored in the read bank 182-*n* corresponding to the read group number GN, and outputs the read setting value to the signal processing unit 171.

In step S57, the signal processing unit 171 performs signal processing on the image data with a processing content corresponding to the setting value supplied from the selection unit 184, and outputs a processing result to the AP 133.

In step S58, the copy control unit 183 determines whether or not the counter n has the maximum value (the number of read banks 182 of the companion chip 132=N).

In step S58, in a case where the counter n does not have the maximum value, the processing proceeds to step S59.

In step S59, the copy control unit 183 increments the counter n by 1.

On the other hand, in a case where the counter n has the maximum value in step S58, the processing proceeds to step S60.

In step S60, the copy control unit 183 initializes the counter n to 0.

In step S61, it is determined whether or not an instruction for termination is given, and in a case where the instruction for termination is not given, the processing returns to step S51, and the subsequent processing is repeated.

Then, in a case where it is determined in step S61 that the instruction for termination is given, the processing ends.

Through the above series of processing, in the image sensor 131 and the companion chip 132, every time the setting value is supplied from the AP 133, the counter g for setting the group number GN and the counter n for identifying the read banks 182-0 to 182-N in the register 172 of the companion chip 132 are incremented in synchronization with each other.

Furthermore, in the image sensor 131, the group number GN corresponding to the order in which the setting value used in the signal processing unit 153 is supplied from the AP 133 is set by the counter g, stored in the image data, and output to the companion chip 132.

Moreover, in the companion chip 132, the setting values are stored in the read banks 182-0 to 182-N specified by the counter n corresponding to the order in which the setting value is supplied from the AP 133, and the setting value stored in one of the read banks 182 corresponding to the group number GN stored in the image data supplied from the image sensor 131 is read and used in the signal processing unit 171.

As a result, in the signal processing unit 171 of the companion chip 132, the same setting value signal processing as the setting value used in the signal processing unit 153 of the image sensor 131 is implemented.

As a result, the signal processing unit 153 of the image sensor 131 and the signal processing unit 171 in the companion chip 132 can perform signal processing based on the same setting value on the same image data, and it is possible to inhibit inconsistency in the setting values.

Note that the present disclosure can also have the following configurations.

<1> An imaging device including:

an image sensor that captures an image and performs first signal processing on the image to output the image as image data;

a companion chip that performs second signal processing on the image data output from the image sensor to output the image data; and an application processor that supplies a setting value to each of the first signal processing performed by the image sensor and the second signal processing performed by the companion chip, in which the image sensor stores identification information for identifying the setting value used for the first signal processing in the image data, and outputs the image data to the companion chip, and the companion chip reads the identification information stored in the image data, and performs the second signal processing on the image data by using the setting value corresponding to the identification information.

<2> The imaging device according to <1>, in which the image sensor generates the identification information for identifying the setting value used for the first signal processing according to an order in which the setting value is supplied from the application processor, stores the identification information in the image data, and outputs the image data to the companion chip, and the companion chip stores a plurality of the setting values to cause orders in which the setting values are supplied from the application processor to be recognizable, and performs the second signal processing on the image data by using the setting value stored in an order corresponding to the identification information stored in the image data.

<3> The imaging device according to <2>, in which the image sensor includes:

a first register that stores a setting value supplied from the application processor;

a first signal processing unit that reads the setting value stored in the first register and performs the first signal processing on the image data;

an identification information generation unit that generates the identification information on the basis of an order of the setting value supplied from the application processor; and an image output control unit that stores the identification information generated by the identification information generation unit in the image data subjected to signal processing in the first signal processing unit and outputs the image data to the companion chip, and the companion chip includes:

a second register that stores a plurality of setting values supplied from the application processor such that orders are identifiable; and a second signal processing unit that performs the second signal processing on the image data by using a setting value corresponding to the identification information stored in the image data supplied from the image sensor among a plurality of the setting values stored in the second register.

<4> The imaging device according to <3>, in which the identification information generation unit includes a counter that counts the order of the setting value supplied from the application processor, and generates the identification information on the basis of a value of the counter.

<5> The imaging device according to <4>, in which the first register includes:

a first write bank that temporarily stores the setting value supplied from the application processor; and a first read bank that copies and stores the setting value stored in the first write bank on the basis of a vertical synchronization signal and a setting reflection inhibition signal, the first signal processing unit performs the first signal processing on the image data on the basis of the setting value stored in the first read bank, the identification information generation unit generates identification information on the basis of the value of the counter when the setting value stored in the first write bank is copied to be copied and stored in the first read bank, the second register includes:

a second write bank that temporarily stores the setting value supplied from the application processor;

a plurality of second read banks that copies and stores the setting value stored in the second write bank such that an order in which the setting value is supplied from the application processor is recognizable; and a selection unit that selects a setting value of an order corresponding to the identification information from among setting values stored in the plurality of second read banks, and the second signal processing unit performs the second signal processing on the image data by using the setting value selected by the selection unit.

<6> The imaging device according to <5>, in which when the vertical synchronization signal is generated and the setting reflection inhibition signal is not generated, the setting value stored in the first write bank is copied and stored in the first read bank, and the identification information generation unit generates the identification information on the basis of the value of the counter.

<7> The imaging device according to any of <3> to <6>, in which the image output control unit converts the image data subjected to the signal processing in the first signal processing unit into a predetermined data format of a protocol compatible with an interface standard, stores the identification information in the data format, and outputs the image data converted to the companion chip.

<8> The imaging device according to any of <3> to <6>, in which the image output control unit converts the image data subjected to the signal processing in the first signal processing unit into a predetermined data format of a protocol compatible with an interface standard, stores the identification information at a predetermined position in the predetermined data format, and outputs the image data converted to the companion chip.

<9> The imaging device according to <8>, in which the predetermined data format includes mobile industry processor interface (MIPI) and scalable low voltage signaling (SLVS).

<10> The imaging device according to <9>, in which the image output control unit converts the image data subjected to the signal processing in the first signal processing unit into a data format of the MIPI, stores the identification information in an Embedded Data Line (EBD), a margin pixel area (Effective Margin Area), or a user defined area (User Define (UD)) in the data format of the MIPI, and outputs the image data converted to the companion chip.

<11> The imaging device according to <9>, in which the image output control unit converts the image data subjected to the signal processing in the first signal processing unit into a data format of the SLVS, stores the identification information in an Embedded Data Line (EBD) or a margin pixel area (Effective Margin Area) in the data format of the SLVS, and outputs the image data converted to the companion chip.

<12> A method of operating an imaging device including:

an image sensor;

a companion chip; and an application processor, the method including a step in which:

the image sensor captures an image, and performs first signal processing on the image to output the image as image data;

the companion chip performs second signal processing on the image data output from the image sensor to output the image data; and the application processor supplies a setting value to each of the first signal processing performed by the image sensor and the second signal processing performed by the companion chip, in which the image sensor stores identification information for identifying the setting value used for the first signal processing in the image data, and outputs the image data to the companion chip, and the companion chip reads the identification information stored in the image data, and performs the second signal processing on the image data by using the setting value corresponding to the identification information.

REFERENCE SIGNS LIST

111 Imaging device
131 Image sensor
132 Companion chip
133 Application processor (AP)
151 Pixel array
152 ADC
153 Signal processing unit
154 Image output control unit
155 CPU subsystem
156 Register
157 Timing generator
161 Write bank
162 Read bank
163 Copy control unit
164 GPH adjustment unit
171 Signal processing unit
172 Register
181 Write bank
182, 182-1 to 182-N Read bank
183 Copy control unit
184 Selection unit

The invention claimed is:

1. An imaging device comprising:

an image sensor that captures an image and performs first signal processing on the image to output the image as image data;

a companion chip that performs second signal processing on the image data output from the image sensor to output the image data; and an application processor that supplies a setting value to each of the first signal processing performed by the image sensor and the second signal processing performed by the companion chip, wherein the image sensor stores identification information for identifying the setting value used for the first signal processing in the image data, and outputs the image data to the companion chip, and the companion chip reads the identification information stored in the image data, and performs the second signal processing on the image data by using the setting value corresponding to the identification information.

2. The imaging device according to claim 1, wherein the image sensor generates the identification information for identifying the setting value used for the first signal processing according to an order in which the setting value is supplied from the application processor, stores the identification information in the image data, and outputs the image data to the companion chip, and the companion chip stores a plurality of the setting values to cause orders in which the setting values are supplied from the application processor to be recognizable, and performs the second signal processing on the image data by using the setting value stored in an order corresponding to the identification information stored in the image data.

3. The imaging device according to claim 2, wherein the image sensor includes:

a first register that stores a setting value supplied from the application processor;

a first signal processing unit that reads the setting value stored in the first register and performs the first signal processing on the image data;

an identification information generation unit that generates the identification information on a basis of an order of the setting value supplied from the application processor; and an image output control unit that stores the identification information generated by the identification information generation unit in the image data subjected to signal processing in the first signal processing unit and outputs the image data to the companion chip, and the companion chip includes:

a second register that stores a plurality of setting values supplied from the application processor such that orders are identifiable; and a second signal processing unit that performs the second signal processing on the image data by using a setting value corresponding to the identification information stored in the image data supplied from the image sensor among a plurality of the setting values stored in the second register.

4. The imaging device according to claim 3, wherein the identification information generation unit includes a counter that counts the order of the setting value supplied from the application processor, and generates the identification information on a basis of a value of the counter.

5. The imaging device according to claim 4, wherein the first register includes:

a first write bank that temporarily stores the setting value supplied from the application processor; and a first read bank that copies and stores the setting value stored in the first write bank on a basis of a vertical synchronization signal and a setting reflection inhibition signal, the first signal processing unit performs the first signal processing on the image data on a basis of the setting value stored in the first read bank, the identification information generation unit generates identification information on the basis of the value of the counter when the setting value stored in the first write bank is copied to be copied and stored in the first read bank, the second register includes:

a second write bank that temporarily stores the setting value supplied from the application processor;

a plurality of second read banks that copies and stores the setting value stored in the second write bank such that an order in which the setting value is supplied from the application processor is recognizable; and a selection unit that selects a setting value of an order corresponding to the identification information from among setting values stored in the plurality of second read banks, and the second signal processing unit performs the second signal processing on the image data by using the setting value selected by the selection unit.

6. The imaging device according to claim 5, wherein when the vertical synchronization signal is generated and the setting reflection inhibition signal is not generated, the setting value stored in the first write bank is copied and stored in the first read bank, and the identification information generation unit generates the identification information on the basis of the value of the counter.

7. The imaging device according to claim 3, wherein the image output control unit converts the image data subjected to the signal processing in the first signal processing unit into a predetermined data format of a protocol compatible with an interface standard, stores the identification information in the data format, and outputs the image data converted to the companion chip.

8. The imaging device according to claim 3, wherein the image output control unit converts the image data subjected to the signal processing in the first signal processing unit into a predetermined data format of a protocol compatible with an interface standard, stores the identification information at a predetermined position in the predetermined data format, and outputs the image data converted to the companion chip.

9. The imaging device according to claim 8, wherein the predetermined data format includes mobile industry processor interface (MIPI) and scalable low voltage signaling (SLVS).

10. The imaging device according to claim 9, wherein the image output control unit converts the image data subjected to the signal processing in the first signal processing unit into a data format of the MIPI, stores the identification information in an Embedded Data Line (EBD), a margin pixel area (Effective Margin Area), or a user defined area (User Define (UD)) in the data format of the MIPI, and outputs the image data converted to the companion chip.

11. The imaging device according to claim 9, wherein the image output control unit converts the image data subjected to the signal processing in the first signal processing unit into a data format of the SLVS, stores the identification information in an Embedded Data Line (EBD) or a margin pixel area (Effective Margin Area) in the data format of the SLVS, and outputs the image data converted to the companion chip.

12. A method of operating an imaging device including:

an image sensor;

a companion chip; and an application processor, the method comprising a step in which:

the image sensor captures an image, and performs first signal processing on the image to output the image as image data;

the companion chip performs second signal processing on the image data output from the image sensor to output the image data; and the application processor supplies a setting value to each of the first signal processing performed by the image sensor and the second signal processing performed by the companion chip, wherein the image sensor stores identification information for identifying the setting value used for the first signal processing in the image data, and outputs the image data to the companion chip, and the companion chip reads the identification information stored in the image data, and performs the second signal processing on the image data by using the setting value corresponding to the identification information.

* * * * *